United States Patent
Shimakawa

(10) Patent No.: US 7,287,823 B2
(45) Date of Patent: Oct. 30, 2007

(54) INK JET PRINTING APPARATUS AND INK JET PRINTING METHOD

(75) Inventor: Masaharu Shimakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 11/150,118

(22) Filed: Jun. 13, 2005

(65) Prior Publication Data

US 2005/0275686 A1 Dec. 15, 2005

(30) Foreign Application Priority Data

Jun. 15, 2004 (JP) .............................. 2004-177376

(51) Int. Cl.
*B41J 2/205* (2006.01)
(52) U.S. Cl. .......................... 347/15; 358/1.9
(58) Field of Classification Search .................. 347/15, 347/43, 41, 16; 358/1.2, 1.9
See application file for complete search history.

(56) References Cited

U.S. PATENT DOCUMENTS

| | | | |
|---|---|---|---|
| 5,608,438 A | | 3/1997 | Koike et al. |
| 6,084,604 A | * | 7/2000 | Moriyama et al. ............ 347/15 |
| 6,290,330 B1 | * | 9/2001 | Torpey et al. ................ 347/43 |
| 6,709,082 B2 | | 3/2004 | Kaneko |
| 2003/0151642 A1 | | 8/2003 | Kaneko |
| 2005/0151788 A1 | * | 7/2005 | Yao et al. ..................... 347/43 |

FOREIGN PATENT DOCUMENTS

| | | |
|---|---|---|
| JP | 55-65269 | 5/1980 |
| JP | 2-303842 | 12/1990 |
| JP | 7-47762 | 2/1995 |
| JP | 9-25442 | 1/1997 |
| JP | 2003-159827 | 6/2003 |

* cited by examiner

*Primary Examiner*—Lamson Nguyen
(74) *Attorney, Agent, or Firm*—Fitzpatrick, Cella, Harper & Scinto

(57) ABSTRACT

This invention prevents smear and boundary bleeding and allows for printing of black images such as black characters with high quality. For this purpose, an AND operation generates print Bk data by culling original Bk data. Based on the data culled by the AND operation, PCBk application data generation operation generates PCBk application data that is used to apply C, M, Y color inks capable of forming a black by color mixing. Based on the PCBk application data, C, M, Y application data 1 for applying smear prevention color inks, C, M, Y application data 2 for applying boundary bleeding prevention color inks and original C, M, Y data. print C, M, Y data are generated.

19 Claims, 22 Drawing Sheets

TARGET PIXEL
FIG.4A
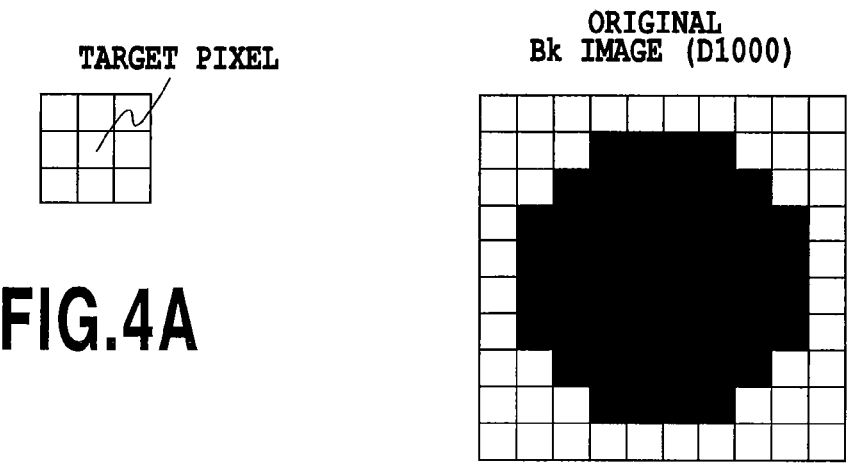
FIG.4B
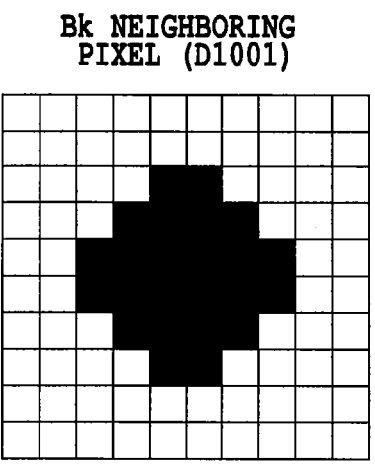
FIG.4C

TARGET PIXEL

ORIGINAL
Bk IMAGE (D1000)

COLOR DOT
AREA IMAGE

COLOR DOT NEIGHBORING
PIXEL IMAGE (D1009)

PRINT Bk IMAGE (D1016)

Bk NEIGHBORING
PIXEL IMAGE (D1001)

Bk NEIGHBORING
PIXEL CULLING IMAGE (D1)

COLOR DOT
NEIGHBORING PIXEL
IMAGE (D1009)

COLOR DOT
NEIGHBORING
PIXEL CULLING
IMAGE (D2)

(c)  (f)

COLOR DOT NEIGHBORING PIXEL CULLING IMAGE

C MASK 2 (31%)

C APPLICATION DATA 2 (D1010)

M MASK 2 (5%)

M APPLICATION DATA 2 (D1011)

Y MASK 2 (5%)

Y APPLICATION DATA 2 (D1012)

ORIGINAL C IMAGE (D1005)

ORIGINAL M IMAGE (D1006)

ORIGINAL Y IMAGE (D1007)

ORIGINAL C,M,Y OR IMAGE (D1008)

ORIGINAL Bk INVERTED IMAGE

COLOR DOT AREA COMPRESSION IMAGE

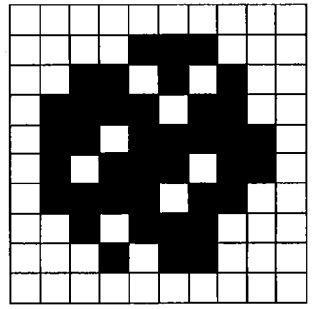
PRINT Bk IMAGE (D1016)
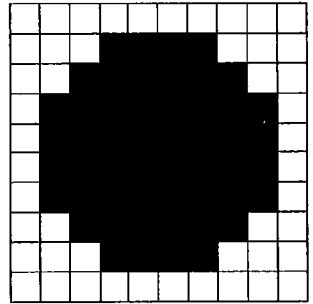
ORIGINAL Bk IMAGE (D1000)
FIG.16A  FIG.16B
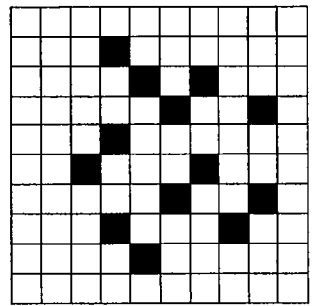
PCBk APPLICATION IMAGE (D1024)
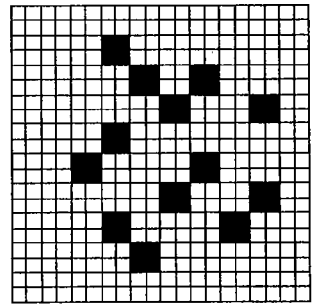
EXPANSION PCBk APPLICATION IMAGE (D11)
FIG.16C  FIG.16D
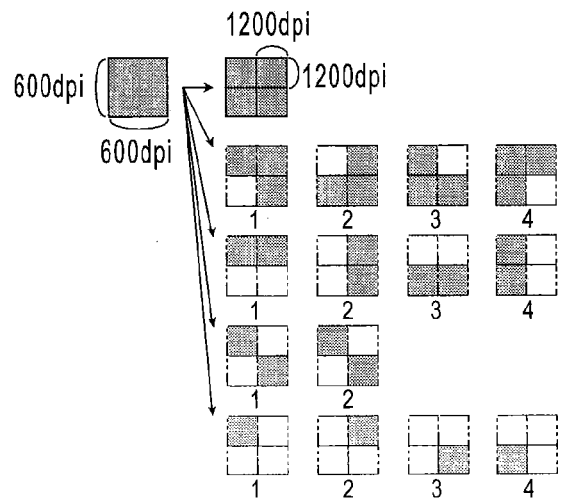

FIG.18A — C APPLICATION IMAGE

FIG.18B — M APPLICATION IMAGE

FIG.18C — Y APPLICATION IMAGE

FIG.18D — EXPANSION C APPLICATION IMAGE (D12)

FIG.18E — EXPANSION M APPLICATION IMAGE (D13)

FIG.18F — EXPANSION Y APPLICATION IMAGE (D14)

PRINT C IMAGE (D1013)

PRINT M IMAGE (D1014)

PRINT Y IMAGE (D1015)

INK JET PRINTING APPARATUS AND INK JET PRINTING METHOD

BACKGROUND OF THE INVENTION

1. Field of the Invention

The present invention relates to an ink jet printing apparatus and an ink jet printing method which form an image by using a print head capable of ejecting a black ink and a plurality of color inks that can describe black by at least color mixing.

2. Description of the Related Art

Because of its high-density and high-speed printing operation, an ink Jet printing apparatus that prints on a variety of kinds of print media has found applications, and been commercialized, as printers and portable printers for printing output media in various equipment.

A common ink jet printing apparatus has a carriage carrying a print head as printing means and an ink tank, a transport means for feeding a print medium, and a control means for controlling these operations. The print head can eject ink droplets from a plurality of nozzles. Such an ink jet printing apparatus forms an image in a print area on the print medium by repeating a printing operation and a print medium feeding operation. The printing operation involves serially scanning the print head in a direction (main scan direction) perpendicular to a print medium transport direction (subscan direction). The print medium feeding operation involves moving the print medium a distance equal to a print width in the subscan direction. This printing method ejects ink onto the print medium according to a print signal to form an image and is widely used thanks to its advantages of a low running cost and a quiet operation. In recent years, various kinds of color ink jet printing apparatus capable of forming color images by using a plurality of color inks have been put to practical use.

The black ink used in such a color ink jet printing apparatus is frequently used for character printing and thus required to provide high level of sharpness, vividness and print density of an image. To meet this requirement, a technique is known to lower a penetrability of black ink into a print medium to retard a colorant in the black ink from soaking in the print medium (for example, Japanese Patent Application Laid-open No. 9-25442).

As for color inks other than black ink, when two different color inks land on a print medium close to each other, the inks may mix together at a boundary between them, degrading a quality of a printed color image, a phenomenon called a boundary bleeding. To prevent this, there is known a technique that enhances a penetrability of color inks into the print medium to prevent the color inks from mixing together on the surface of the print medium (for example. Japanese Patent Application Laid-open No. 55-65269).

The use of a black ink with low penetrability and color inks with high penetrability, however, gives rise to the following two problems.

First, the color inks with high penetrability have a short fixing time whereas the black ink with low penetrability takes longer to be dried and fixed. Thus, when a plurality of sheets of print medium are printed successively, with the printed sheets discharged one after another onto the preceding sheets, the subsequently discharged sheet may get smeared by the black ink applied to the preceding sheet and not yet dried completely as its back comes into contact with the printed front surface of the preceding page. This smear resulting from the contact between the front printed surface of the preceding sheet and the back surface of the subsequent sheet becomes prominent as the printing speed increases.

Second, since the black ink has a low penetrability, an ink spreading may occur in boundary portions on the print medium between black ink landing portions and color ink landing portions (this is called a boundary bleeding). This significantly degrades the quality of color image.

To cope with the above two problems, the following three measures have been taken.

A first measure employs an ink fixing means such as a heating/fixing device. This method enables ink to be fixed in the print medium quickly, preventing smear and boundary bleeding (for example, Japanese Patent Application Laid-open No. 7-47762)

A second measure is to perform a sheet discharge wait control. This method involves delaying the start of printing operation on the second sheet until the ink on the first sheet fully dries, or temporarily halting the discharge operation after the second sheet has been printed. This method too can prevent smear (for instance, Japanese Patent Application Laid-open No. 2-303842)

A third measure is to apply highly penetrating color inks so as to overlap those areas where the black ink is to be applied. Applying the black ink to areas of the print medium where color inks are applied allows the black ink to be fixed more easily on the print medium surface, minimizing smear. Further, the boundary bleeding can also be reduced by the use of an ink set which makes the black ink and the color inks react with each other for coagulation (e.g., Japanese Patent Application Laid-open No. 2003-159827).

These first to third measure, however, have the following drawbacks.

The first measure employs a fixing means, so an increase in cost and size of the apparatus is unavoidable Further, since in the serial printer, the print medium feed operation is performed intermittently, when the print medium is passed through the fixing device, there may be variations in how well the printed image is fixed, according to the locations on the print medium.

The second measure degrades throughput since it performs the print medium discharge operation delay control.

Since the third measure applies color inks in a way that overlaps black ink application areas, degradations may result in terms of a sharpness of a black ink image and a printed quality of black characters If the amount of color inks required for the prevention of smear and the amount of color inks required for the prevention of boundary bleeding differ, it is difficult to prevent both of smear and boundary bleeding at the same time.

SUMMARY OF THE INVENTION

The present invention can provide an ink jet printing apparatus and an ink jet printing method which can prevent smear and boundary bleeding and print black images such as black characters with high quality.

In a first aspect of the present invention, there is provided an Ink Jet printing apparatus to form an image on a print medium by using a print head, wherein the print head can eject at least a black ink and a plurality of color inks capable of forming a black by color mixing; the ink jet printing apparatus comprising:

print black data generation means for generating print black data used to apply the black ink to a part of pixels in a black image area;

first color application data generation means for generating first color application data used to apply the plurality of color inks to a pixel in the black image area to which the black ink is not applied;

second color application data generation means for generating second color application data used to apply at least one of the plurality of color inks to at least a part of pixels in the black image area to which the black ink is applied; and control means for controlling application of the black ink and the plurality of color inks from the print head onto the black image area based on the print black data, the first color application data, and the second color application data.

In a second aspect of the present invention, there is provided an ink jet printing method to form an image on a print medium by using a print head, wherein the print head can eject at least a black ink and a plurality of color inks capable of forming a black by color mixing; the ink jet printing method comprising the steps of:

generating print black data used to apply the black ink to a part of pixels in a black image area;

generating first color application data used to apply the plurality of color inks to a pixel in the black image area to which the black ink is not applied;

generating second color application data used to apply at least one of the plurality of color inks to at least a part of pixels in the black image area to which the black ink is applied; and applying the black Ink and the plurality of color inks from the print head onto the black image area based on the print black data, the first color application data, and the second color application data.

This invention applies a plurality of color inks, which can form a black by color mixing, to a print area corresponding to data that is thinned out from black data, thereby reducing the amount of black ink applied to the area where black dots are formed at a relatively high concentration. This in turn prevents smear. Further, by applying a plurality of color inks, which can form a black by color mixing, it is possible to prevent a reduction in black density. In that case, smear can be prevented more reliably by using color inks having a superior fixing characteristic to that of the black ink.

When the color data has a higher resolution than the black data, the color ink droplets forming color dots are smaller in size than the black ink droplets forming black dots. Thus, the amount of color Inks, capable of forming a color-processed black and applied to an area from which black dots are thinned out, can be kept small.

Further, color ink application data for smear prevention in an area where black dots are formed at high duty can be generated; and color ink application data for preventing boundary bleeding in a boundary portion between the black ink and color ink application areas can also be generated. Therefore, the smear and the boundary bleeding can be prevented, thus assuring high quality printing of black images such as black characters.

The above and other objects, effects, features and advantages of the present invention will become more apparent from the following description of embodiments thereof taken in conjunction with the accompanying drawings.

BRIEF DESCRIPTION OF THE DRAWINGS

FIG. 4A, FIG. 4B and FIG. 4C are explanatory diagrams showing how the black dot neighboring pixel data detection operation of FIG. 1 is performed;

FIG. 16A, FIG. 16B, FIG. 16C, FIG. 16D and FIG. 16E are explanatory diagrams showing a PCBk application data expansion operation of FIG. 14;

FIG. 18A, FIG. 18B, FIG. 18C, FIG. 18D, FIG. 18E, FIG. 18F and FIG. 18G are explanatory diagrams showing a color application data expansion operation of FIG. 14;

DETAILED DESCRIPTION OF PREFERRED EMBODIMENTS

Now, embodiments of the present invention will be described by referring to the accompanying drawings. The following embodiments are examples applied to an ink jet printing apparatus.

First Embodiment

Figure 20:
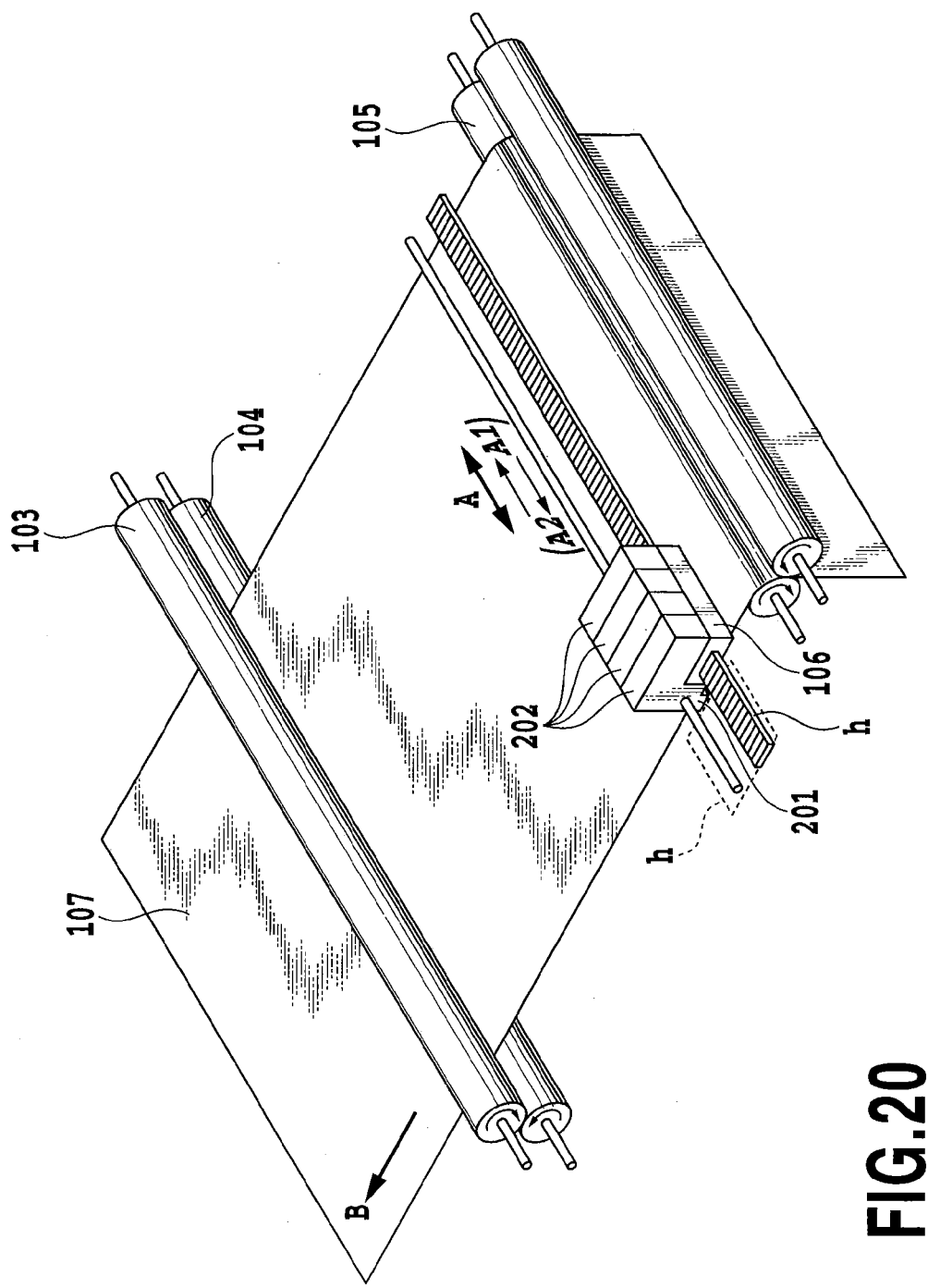
FIG. 20 is a schematic perspective view of a printing apparatus according to the first embodiment of this invention.
Figure 21:
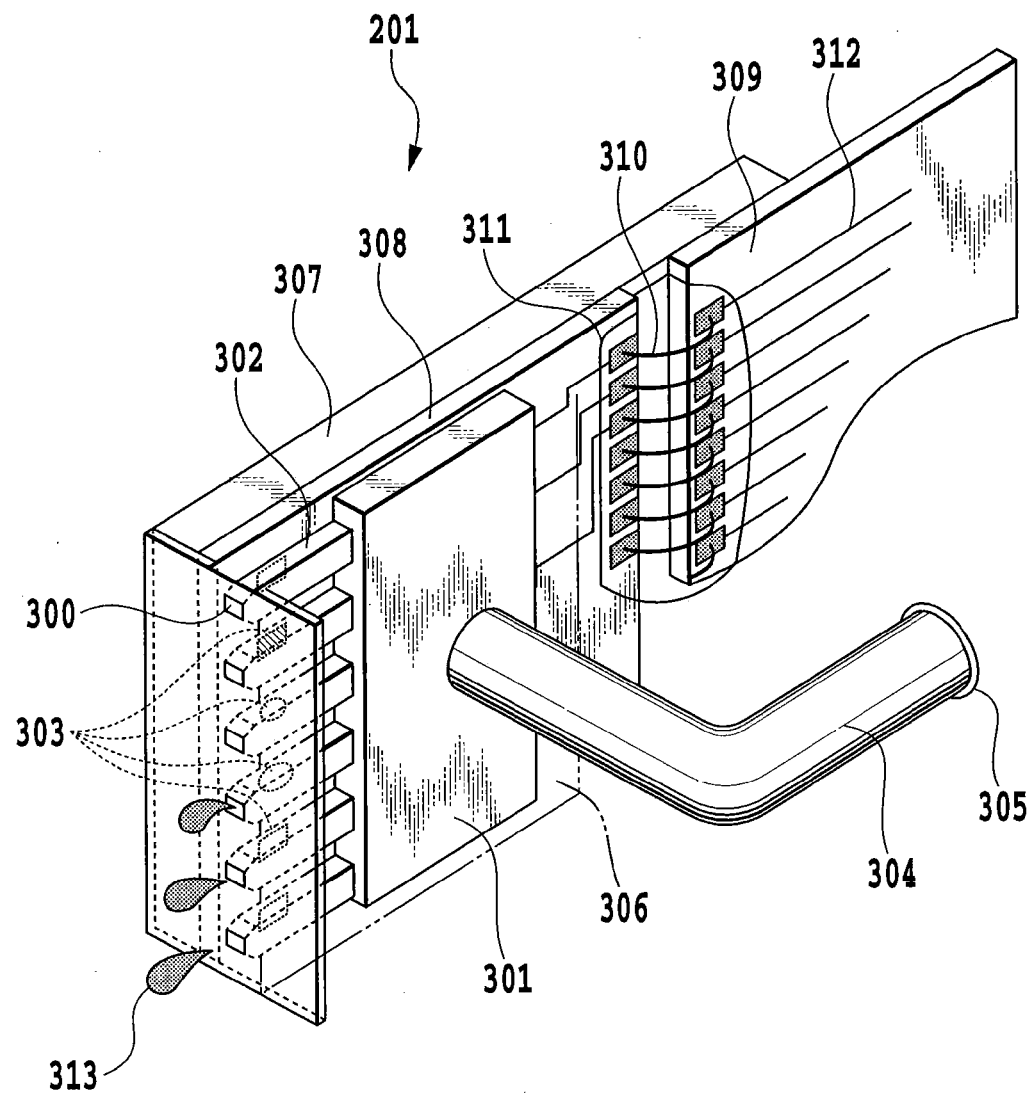
FIG. 21 is a perspective view showing an essential portion of a print head of the printing apparatus of FIG. 20.
Figure 22:
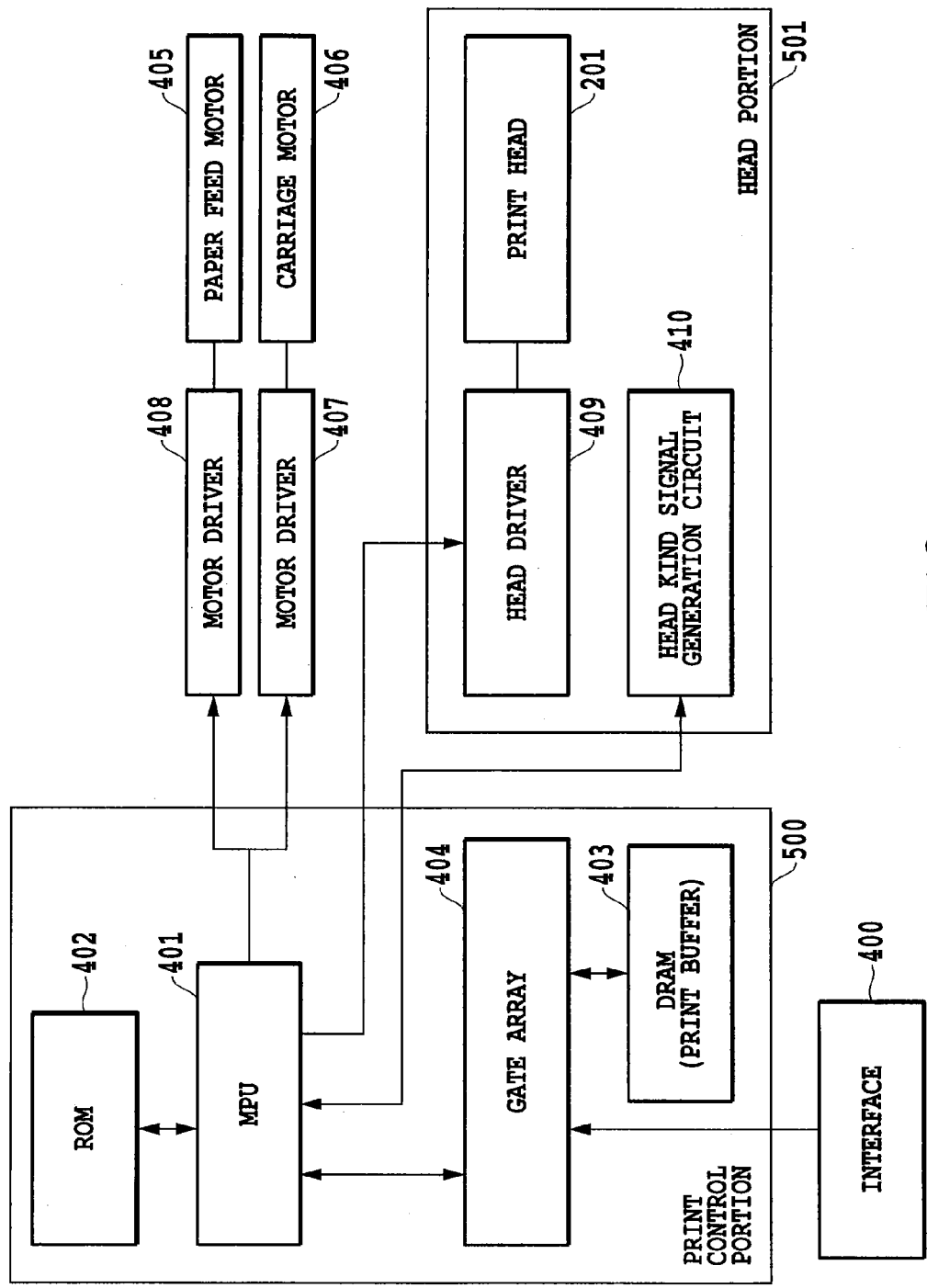
FIG. 22 is a block diagram showing a control system of the printing apparatus of FIG. 20.

FIG. 20 to FIG. 22 show an example construction of an ink jet printing apparatus that can apply this invention. FIG. 1 to FIG. 13C represent the first embodiment of the invention.

Example Construction of Printing Apparatus

FIG. 20 is a schematic perspective view showing an example construction of a color ink jet printing apparatus to which the present invention can be applied.

In FIG. 20, denoted 202 are four Ink cartridges, which comprise ink tanks containing four color Inks (black (Bk), cyan (C), magenta (M) and yellow (Y)) and a print head 201 capable of ejecting these Inks. The details of the construction of the print head 201 will be described later. A paper feed roller 103, that rotates together with an auxiliary roller 104 in a direction of arrow, holds and feeds a sheet of print medium 107 in a direction of arrow B (subscan direction). Along with these rollers 103 and 104, a roller 105 also keeps the sheet 107 in place. A carriage 106 mounts four ink cartridges 202 and moves together with them in a main scan direction indicated by an arrow A. When the printing apparatus is at rest or a print head recovery operation is performed, the carriage 106 stands by at a home position h indicated by a dashed line in the figure.

Before the printing operation starts, the carriage 106 is situated at the home position h. Upon receiving a print start command, the printing apparatus moves the carriage 106 in the main scan direction and at the same time drives print elements in the print head 201 to eject ink, forming an image over an area of the print medium 107 corresponding to a print width of the print head 201. When the printing scan up to the end of the print area on the print medium 107 in the main scan direction is completed, the carriage 106 returns to the home position h before performing the printing scan again in the main scan direction. After the previous printing scan is finished before the next printing scan begins, the paper feed roller 103 rotates in the arrow direction to feed the sheet a predetermined distance in the subscan direction. By repetitively alternating the printing scan and the paper feeding an image is formed on one page of the print medium. The printing operation of ejecting ink from the print head 201 is controlled by a print control means (not shown).

In order to increase the print speed, a bidirectional printing system may be used, which performs the printing operation not only when the carriage 106 travels in the forward direction (a direction in which the carriage 106 moves away from the home position h) but also when it returns toward the home position h.

The ink cartridges 202 may be constructed in such a way that ink tanks containing inks and their associated print heads 201 for ejecting inks toward the print medium 107 are integrally formed as one piece. The ink tanks and the print heads 201 may also be removably mounted in the carriage 106. Further, the print heads 201 may be constructed as a single print head capable of ejecting a plurality of inks.

At a position where the recovery operation is performed, there are provided a capping means (not shown) that caps a front surface (ink ejection port forming face) of the print head 201 and a recovery unit (not shown). With the nozzle face of the print head capped by the capping means, the recovery unit performs a head recovery operation to remove viscous ink and bubbles from within the print head 201. A cleaning blade (not shown) by the capping means protrudes toward the print head 201 so that the front surface of the print head can be brought into sliding contact with the cleaning blade. After the recovery operation, the cleaning blade is projected into the travel path of the print head so as to wipe clean the front surface of the print head, removing ink droplets and dirt adhering to the front surface.

Example Construction of Print Head

FIG. 21 is a perspective view showing an essential portion of the construction of the print head 201.

The print head 201 of this example is formed with a plurality of ejection ports 300 at a predetermined pitch which are connected to a common ink chamber 301 through ink paths 302. In a wall surface of each ink path 302 a printing element 303 to generate ink ejection energy is provided. This printing element 303 is a heater (electrothermal transducer) to generate a thermal energy. The printing elements 303 and their drive circuits are fabricated on a silicon substrate by using a semiconductor manufacturing technique. A temperature sensor (not shown) and a sub-heater (not shown) are also formed on the same silicon substrate by the similar semiconductor manufacturing process. A silicon plate 308 formed with electric wiring is bonded to a heat dissipating aluminum base plate 307. A circuit connecting portion 311 on the silicon plate 308 is connected to a printed circuit board 309 through superfine wires 310, and signals from the printing apparatus body are Input through a signal circuit 312.

The ink paths 302 and the common ink chamber 301 are formed of an injection-molded plastic cover 306 The common ink chamber 301 is connected to the ink tank through a joint pipe 304 and an ink filter 305, so ink is supplied from the ink tank to the common ink chamber 301 where it is temporarily stored The ink temporarily stored in the common ink chamber 301 enters into the ink paths 302 by capillary attraction and forms meniscuses in the ejection ports 300, filling the ink paths 302. When the printing elements 303 as the heaters are energized through electrodes (not shown), the ink close to the printing elements 303 is heated rapidly to form a bubble in the associated ink paths 302. The expanding bubbles expel ink droplets 313 from the ejection ports 300.

(Ink Characteristics)

The black (K) ink used in this embodiment has a predetermined penetrability, and the cyan (C), magenta (M) and yellow (Y) color inks have a higher penetrability than that of black ink. When the black ink with low penetrability is applied to the same area where the color inks with high penetrability are applied, the penetration speed of the black ink Improves, allowing it to penetrate into the print medium quickly, thus preventing smear.

However, as the penetrability of the black ink improves, a coloring component of the black ink as well as solvent component penetrates into the print medium quickly and in large amounts, tending to lower the density of a black image. To alleviate the black image density reduction, this embodiment adds to cyan (C) ink a component that coagulates the colorant of black ink. With this arrangement, the colorant of black ink can be coagulated instantly-and the coagulated black ink colorant be left on the surface of the print medium, thus keeping the black image density from becoming lower.

This embodiment, as described above, uses a black ink with low penetrability and cyan, magenta and yellow color inks with high penetrability and adds to the cyan ink a component that coagulates the black ink colorant. This arrangement makes it possible to fix a black image quickly without causing a reduction in black image density. This in turn prevents smear effectively.

The level of penetrability can be adjusted by changing an amount of surfactant contained, which typically includes Acetylenol (Acetylenol is a product name of Kawaken Fine Chemical; it is ethylene oxide added to acetylene glycol and is expressed as ethylene oxide-2,4,7,9-tetramethyl-5-decyne-4,7-diol). Increasing the surfactant content can enhance the penetrability. Therefore, in this embodiment the content of surfactant is set higher in color inks than in black ink.

As a component to coagulate the black ink colorant, polyvalent metal salt Is suitably used. The polyvalent metal salt comprises divalent or higher metal ions and anions that combine with these polyvalent metal ions. Examples of polyvalent metal ions include divalent metal ions such as $Ca^{2+}$, $Cu^{2+}$, $Ni^{2+}$, $Mg^{2+}$ and $Zn^{2+}$ and trivalent metal ions such as $Fe^{3+}$ and $Al^{3+}$. Examples of anions include $Cl^-$, $NO_3^-$ and $SO_4^{2-}$.

Example Configuration of Control System in Printing Apparatus

FIG. 22 is a block diagram showing an example configuration of a control system in the printing apparatus.

Denoted 400 is an interface to input a print signal. 401 a MPU, and 402 a program ROM that stores a control program to be executed by the MPU 401. The MPU 401 executes data processing as described later. Designated 403 is a dynamic RAM (DRAM) that stores various kinds of data (print signal and print data to be fed to the print head 201) and also the number of printed dots and the number of times that the ink tank and the print head 201 has been replaced. A gate array 404 controls a supply of print data to the print head 201 and also a data transfer among the interface 400, MPU 401 and DRAM 403. The interface 400 is connected to a host computer (host device) not shown, from which image data to be printed by the printing apparatus is supplied. Denoted 405 is a carrier motor (CR motor) to scan the print head 201, and 406 a feed motor (LF motor) to feed a sheet of print medium 107. Motor drivers 407, 408 drive the feed motor 405 and the carrier motor 406, respectively. Denoted 409 is a head driver to activate the print head 201.

Example Configuration of Data Processing System

Figure 1:
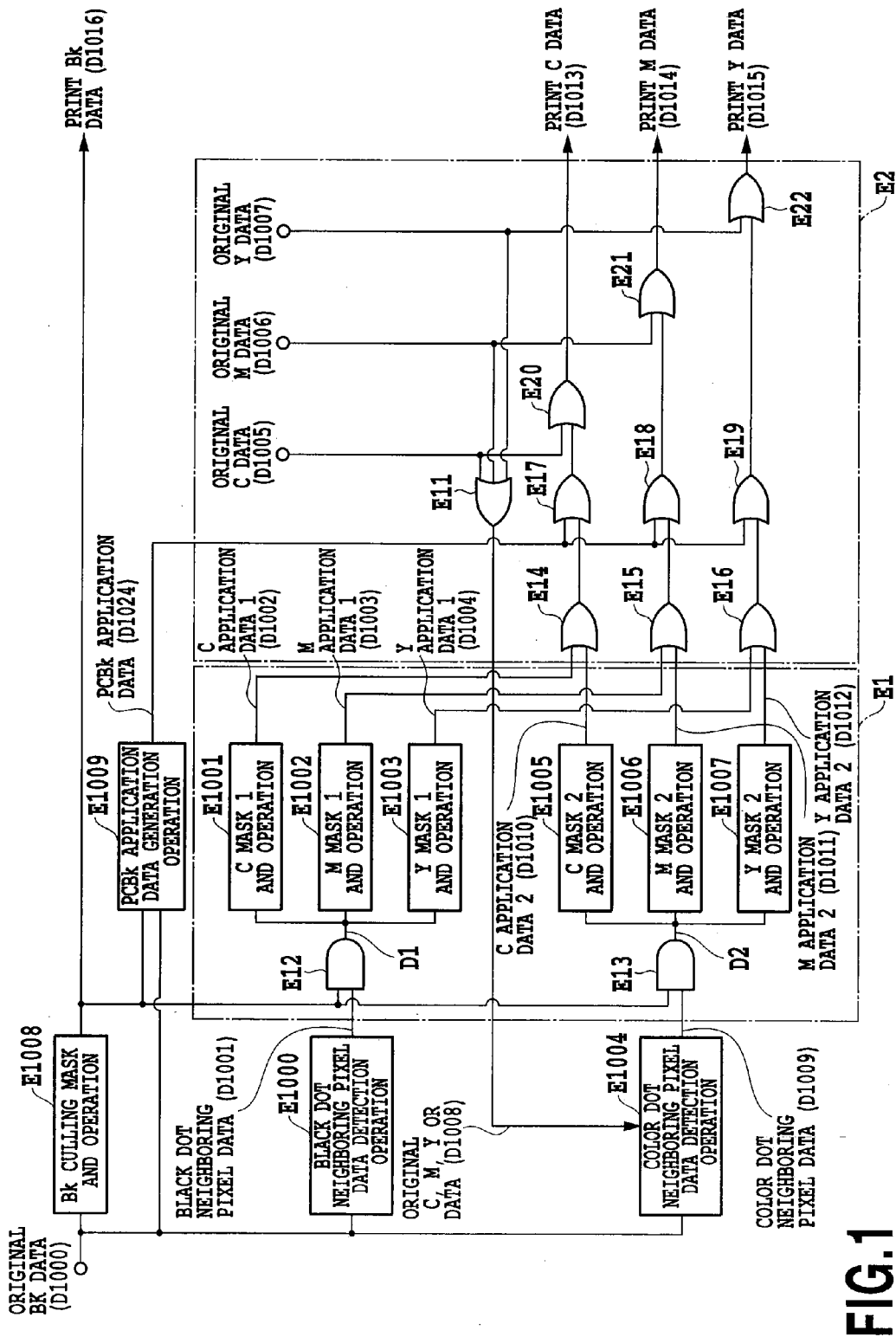
FIG. 1 is a block diagram showing an example configuration of a data processing system in a first embodiment of this invention.

FIG. 1 is a block diagram showing a black dot neighboring pixel data detection operation E1000, a color dot neighboring pixel data detection operation E1004, a Bk culling mask AND operation E1008 for generating print Bk data, a PCBk (process black) application data generation operation E1009, a color dot application data generation operation E1, and a print CMY data generation operation E2.

In FIG. 1, original Bk data D1000 is binary data which is produced by performing binarization processing on multivalue data input from the host computer, or which is directly input from the host computer. This binary data is either "1" or "0" which indicates whether the black (Bk) ink is to be ejected from the corresponding ejection port of the print head 201, i.e., whether a black ink dot is to be formed or not. In this example, the original Bk data D1000 is processed by the Bk culling mask AND operation E1008 into Bk data D1016 to be used in the actual printing. In the following these Bk data D1000, D1016 are also referred to as black dot data.

In the following, these operations will be explained by taking images shown in FIG. 2A to FIG. 2E as an example.

Figure 2A:
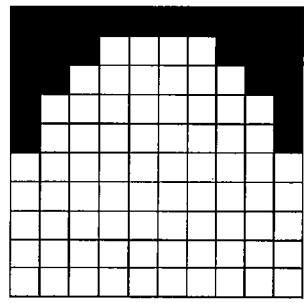
FIGS. 2A, 2B, 2C, 2D and 2E are explanatory diagrams representing images corresponding to image data produced in the data processing system of FIG. 1.
Figure 2B:
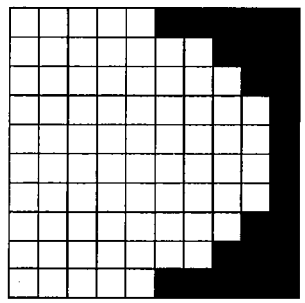
Figure 2C:
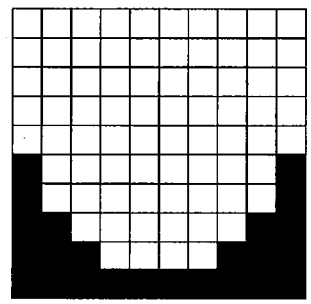
Figure 2D:
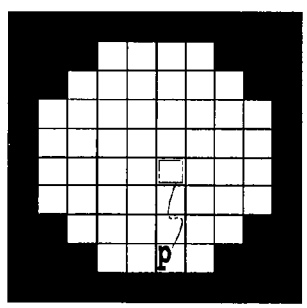
Figure 2E:
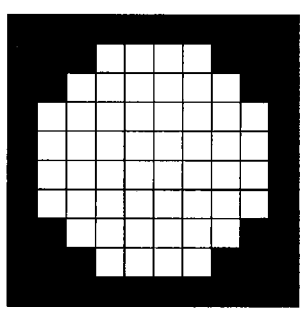

FIG. 2A represents an image corresponding to original C data D1005 (original C image), FIG. 2B represents an image corresponding to original M data D1006 (original M image), and FIG. 2C represents an image corresponding to original Y data D1007 (original Y image). FIG. 2E shows an image (original Bk inverted image) obtained by inverting an image corresponding to the original Bk data D1000 (original Bk image in FIG. 4B described later). These images of FIG. 2A, FIG. 2B and FIG. 2C are formed of 100 pixels (10×10) and logically added to produce a color dot area image shown in FIG. 2D. A calculation unit E11 in FIG. 1 takes a logical sum of original C data D1005, original M data D1006 and original Y data D1007 to produce original CMY OR data D1008 corresponding to the color dot area of FIG. 2D. In the following, these C, M and Y data D1005-D1007, D1013-D1015 are also called color dot data.

In this example, there are no pixels for original C, M and Y images of FIGS. 2A, 2B and 2C in the print area of the original Bk image (see FIG. 4B). If any pixels of the original C, M and Y images exist in the original Bk image print area, this means that there is a pixel P such as shown by a two-dot chain line in FIG. 2D. Such a pixel P can be removed by taking a logical product or AND of the image data of FIG. 2D and image data of FIG. 2E.

(Black Dot Neighboring Pixel Data Detection Operation E1000)

The black dot neighboring pixel data detection operation E1000 detects pixels (black pixels) each made up of black dots formed close together in order to prevent or alleviate smear.

Figure 3:
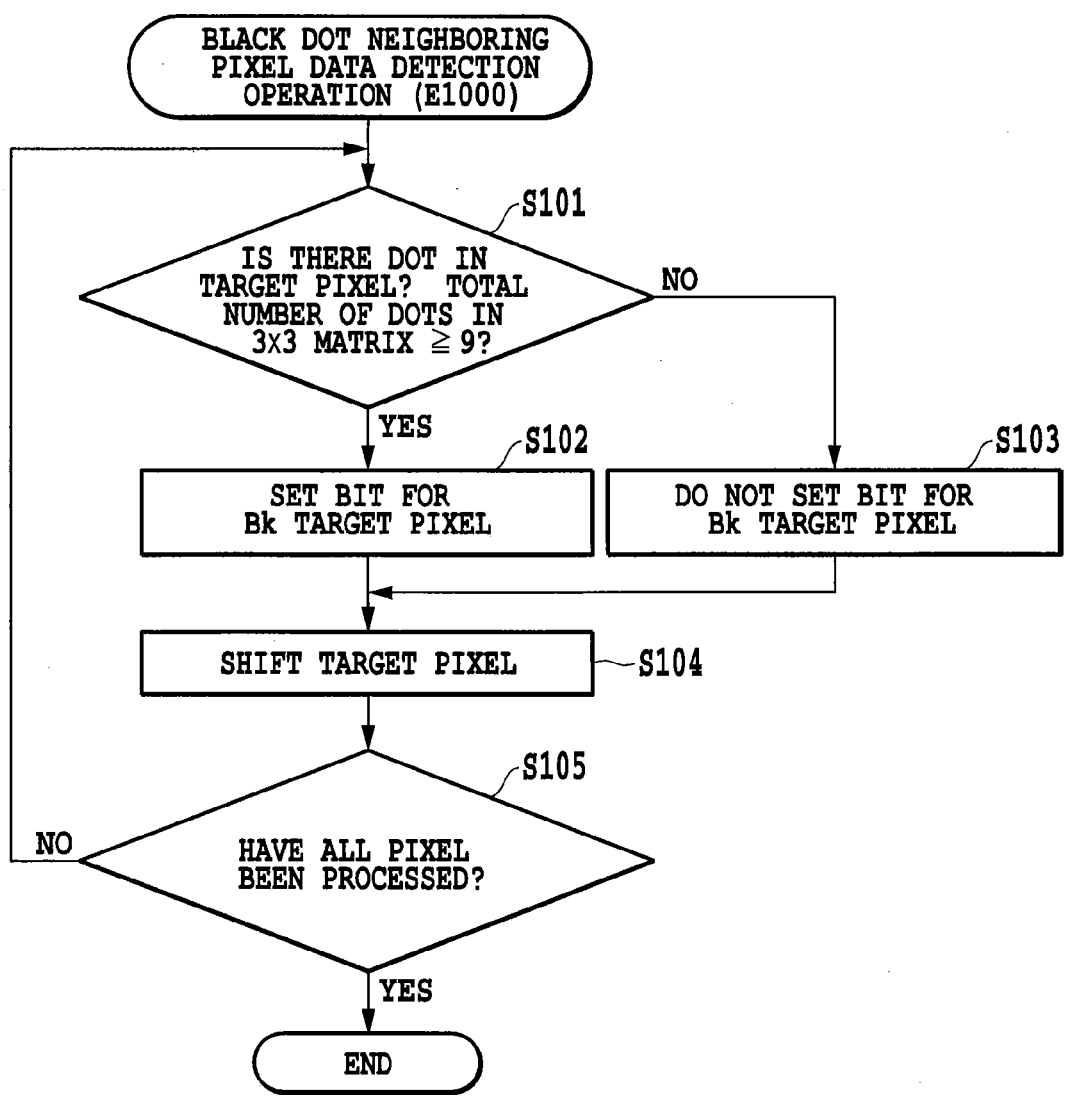
FIG. 3 is a flow chart showing a sequence of steps performed by a black dot neighboring pixel data detection operation in FIG. 1.

FIG. 3 is a flow chart showing a sequence of steps performed by the detection operation E1000. FIG. 4A shows a 3×3 9-pixel matrix with a pixel (target pixel) of interest located at the center. FIG. 4B represents data (original Bk data) D1000 for the original Bk image FIG. 4C represents data (black dot neighboring pixel data) D1001 for a Bk neighboring pixel image detected by the detection operation E1000.

In forming black dots in the pixel (target pixel) of interest, the detection operation B1000 first checks if the total number of black dots formed in the 3×3 9-pixel matrix with the pixel of interest located at the center is equal to or larger than a predetermined number (in this case, nine) (step S101). The pixel of interest where black dots are formed is also referred to as a Bk pixel of interest or target Bk pixel. If the total number of black dots in the 9-pixel matrix is equal to or larger than the predetermined value, a bit for the target Bk pixel is set (i.e., 1 is set) (step S102). If it is not equal to or larger than the predetermined value, the bit for the target Bk pixel under consideration is not set (i.e., 0 is set) (step 5103). Then, the pixel of interest is shifted by one pixel (step S104) and, for the next 3×3 9-pixel matrix with the newly target pixel at the center, the decision of step S101 is made. After the 1/0 setting of bit for all target Bk pixels under consideration is completed, the detection operation is ended (step S105). Here, although a threshold for the total black dot number is set at 9, it is not restricted to this value and can be set to an optimal value according to the characteristics of inks and the construction of printing apparatus.

The execution of the detection operation E1000 for the original Bk image shown in FIG. 4B produces black dot neighboring pixel data D1001 of FIG. 4C made up of Bk neighboring pixel image data whose bits are set. The pixels with their bits set are those in which black dots are formed close together. To these pixels a color Ink is applied for preventing smear. As can be seen from comparison between FIG. 4B and FIG. 4C, this detection operation E1000 detects as the black dot neighboring pixel data D1001 only those areas where black dots are formed at a relatively high duty. Edge areas of an image where black dots are formed at a relatively low duty are not detected as the black dot neighboring pixel data D1001 and therefore are not applied with color inks. As a result, a sharpness of the black image can be maintained.

(Color Dot Neighboring Pixel Data Detection Operation E1004)

To prevent the bleeding of black ink and color inks, the color dot neighboring pixel data detection operation E1004 detects those pixels where black dots are formed close to color dots.

Figure 5:
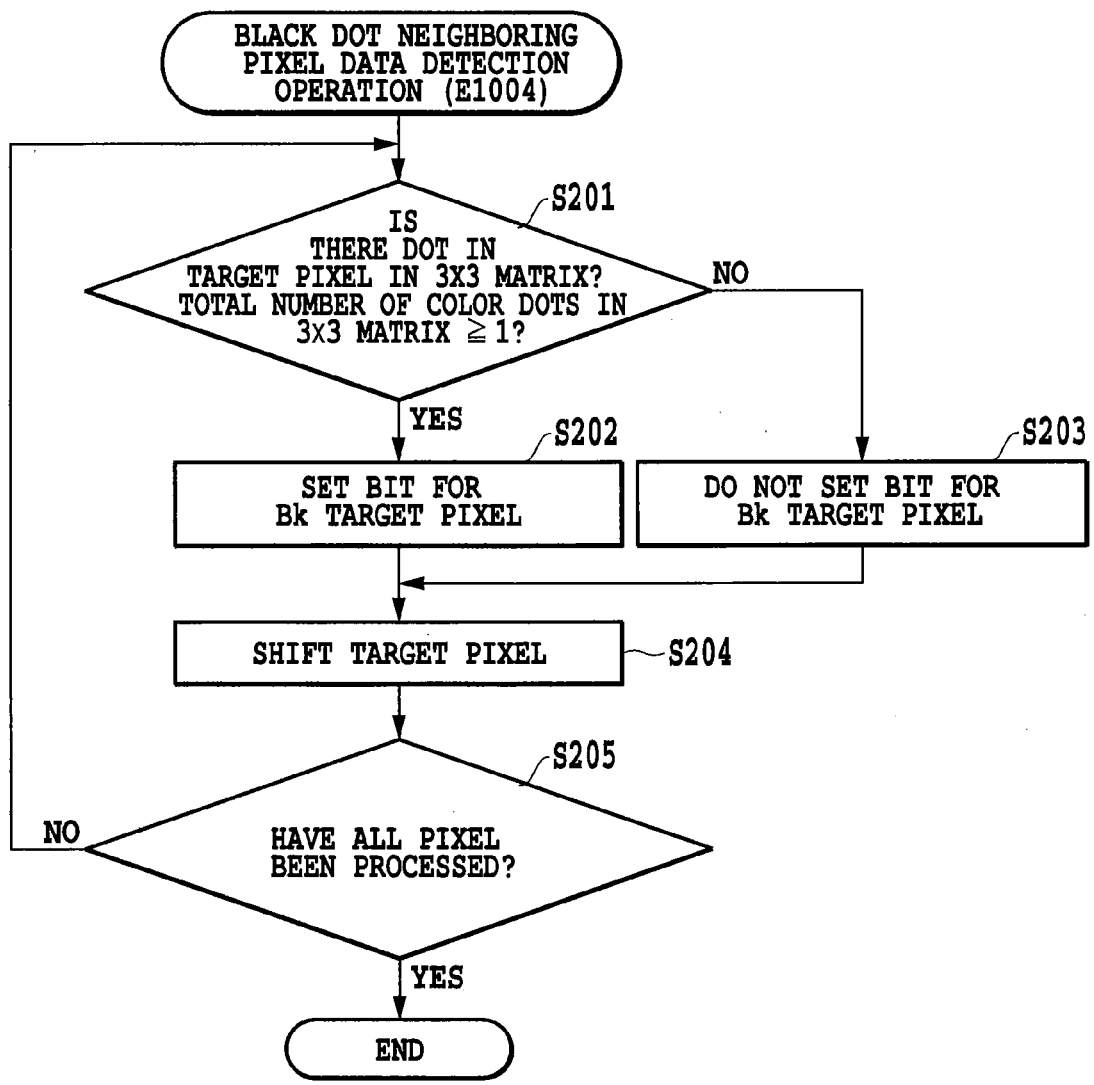
FIG. 5 is a flow chart showing a sequence of steps performed by the black dot neighboring pixel data detection operation of FIG. 1.
Figure 6A:
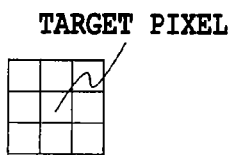
FIG. 6A, FIG. 6B, FIG. 6C and FIG. 6D are explanatory diagrams showing how a color dot neighboring pixel data detection operation of FIG. 1 is performed.
Figure 6B:
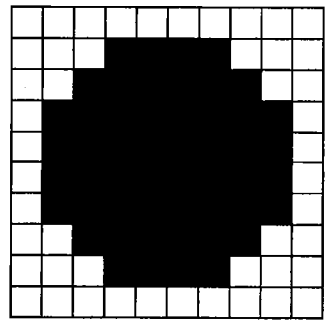
Figure 6C:
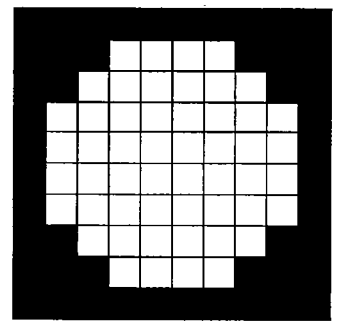
Figure 6D:
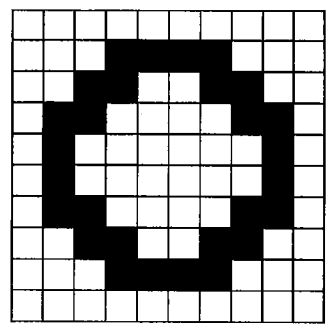

FIG. 5 is a flow chart showing a sequence of steps performed by the detection operation E1004. FIG. 6A shows a 3×3 9-pixel matrix with a pixel (target pixel) of interest located at the center. FIG. 6B represents data (original Bk data) D1000 for the original Bk image. FIG. 6C represents data for a color dot area image similar to FIG. 2D. FIG. 6D shows data for color neighboring pixel image (color dot neighboring pixel data) D1009 detected by the detection operation E1004.

In forming black dots in the pixel (target pixel) of interest, the detection operation E1004 first check if the total number of color dots formed in the 3×3 9-pixel matrix with the pixel of interest located at the center is equal to or larger than one (step S201). The pixel of interest where black dots are formed is also referred to as a Bk pixel of interest or target Bk pixel. If the total number of color dots in the 9-pixel matrix is equal to or larger than one, a bit for the target Bk pixel is set (i.e., 1 is set) (step S202). If the total number is not equal to or larger than one, the bit for the target Bk pixel under consideration is not set (i.e., 0 is set) (step S203). Next, the pixel of interest is shifted by one pixel (step S204) and, for the next 3×3 9-pixel matrix with the newly target pixel at the center, the decision of step S201 is made. After the 1/0 setting of bit for all target Bk pixels under consideration is completed, the detection operation is ended (step S205) Here, although a threshold for the total number of color dots is set to 1, it is not limited to this value and can be set to an optimal value according to the characteristics of ink and the characteristics of printing apparatus The execution of the above detection operation E1004 for the original Bk image of FIG. 6B and the color dot area image of FIG. 6C corresponding to the C, M and Y color ink print image results in a color dot neighboring pixel image of FIG. 6D made up of pixels whose bits are set. The detection processing E1004 detects as the color dot neighboring pixel data D1009 only a boundary area between a black ink application area and a color ink application area. Applying color inks to the boundary area can minimize the boundary bleeding.

(Bk Culling Mask AND Operation E1008)

Figures 7A, 7B, 7C:
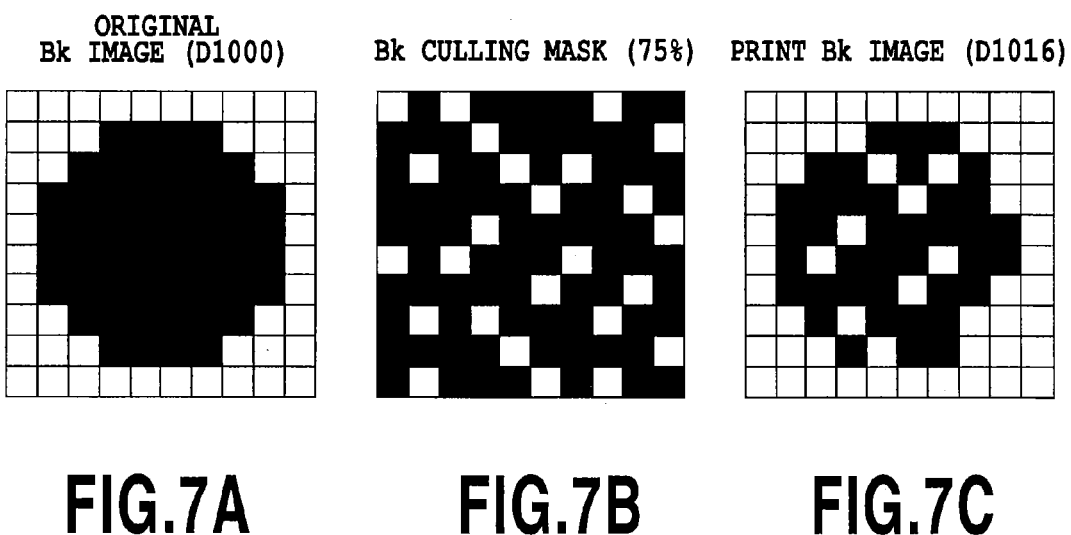
FIG. 7A, FIG. 7B and FIG. 7C are explanatory diagrams showing an AND operation with a Bk culling mask in FIG. 1.

This AND operation E1008 generates print Bk data. In this AND operation E1008, the print Bk data D1016 is generated by culling the original Bk data D1000 using a culling mask, i.e., by taking a logical product or AND of these data. More specifically, the original black image of FIG. 7A corresponding to the original Bk data D1000 is culled or thinned by using the Bk culling mask of FIG. 7B to become a print Bk image of FIG. 7C corresponding to the print Bk Data D1016 In FIG. 7B, areas shown in black represent print-permitted pixels, and areas shown in white represent non-print-permitted pixels. The print-permitted pixels that are not culled accounts for 75% of the total pixels and the non-print-permitted pixels accounts that are culled accounts for 25%. The culling ratio of the Bk culling mask is 25%.

By culling the Bk data that applies black ink of low penetrability, it is possible to prevent smear. The culling amount of the Bk culling mask and the mask size can be determined appropriately according to the ink characteristics and the printing apparatus construction. Further, the arrangement or distribution of dots in the Bk culling mask may have some regularity or randomness.

(Color Dot Application Data Generation Operation E1)

Figure 8A:
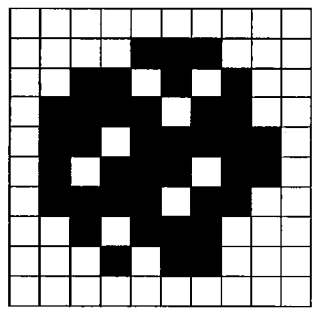
FIG. 8A, FIG. 8B, FIG. 8C, FIG. 8D and FIG. 8E are explanatory diagrams showing a color dot application data generation operation of FIG. 1.
Figure 8B:
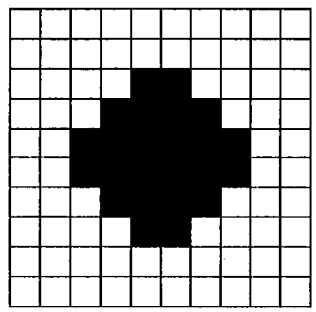
Figure 8C:
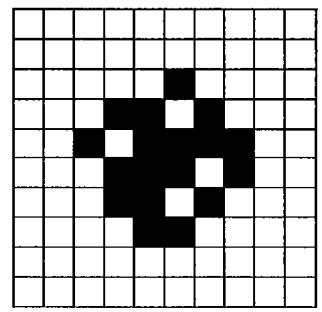

In this generation operation E1, a calculation unit E12 takes a logical product or AND of the print Bk data D1016 corresponding to the print Bk image of FIG. 8A and the black dot neighboring pixel data D1001 corresponding to the Bk neighboring pixel image of FIG. 8B to generate Bk neighboring pixel culling data D1 corresponding to a Bk neighboring pixel culling image of FIG. 8C. A calculation unit E13 takes a logical product or AND of the print Bk data D1016 corresponding to the print Bk image of FIG. 8A and the color dot neighboring pixel data D1009 corresponding to the color dot neighboring pixel image of FIG. 18D to generate color dot neighboring pixel culling data D2 corresponding to a color dot neighboring pixel culling image of FIG. 8E.

The Bk neighboring pixel culling data D1 of FIG. 8C is subjected to an AND operation E1001 with C mask 1, an AND operation E1002 with M mask 1, and an AND operation E1003 with Y mask 1 to generate color dot application data for smear prevention, i.e., C application data 1 D1002, M application data 1 D1003, and Y application data 1 D1004. More specifically, the AND operation E1001 takes a logical product or AND of the Bk neighboring image culling data D1 of FIG. 9A (same as FIG. 8C) and the C mask 1 data of FIG. 9B to generate the C application data 1 D1002 of FIG. 9E. Similarly, the AND operation E1002 takes a logical product or AND of the Bk neighboring image culling data D1 of FIG. 9A and the M mask 1 data of FIG. 9C to generate the M application data 1 D1003 of FIG. 9F Similarly, the AND operation E1003 takes a logical product or AND of the Bk neighboring image culling data D1 of FIG. 9A and the Y mask 1 data of FIG. 9D to generate the Y application data 1 D1004 of FIG. 9G.

In this example, the amount of data that is not culled by the C mask 1 accounts for 18% (the culling ratio of C mask 1 is 72%); the amount of data that Is not culled by the M mask 1 accounts for 5% (the culling ratio of M mask 1 is 95%); and the amount of data that is not culled by Y mask 1 accounts for 5% (the culling ratio of Y mask 1 is 95%). The culling ratio and size of these masks can be determined appropriately according to the ink characteristics and the printing apparatus construction. Further, the arrangement or distribution of dots in these masks 1 may have some regularity or randomness.

Figure 8D:
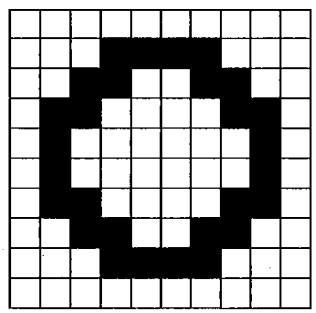
Figure 8E:
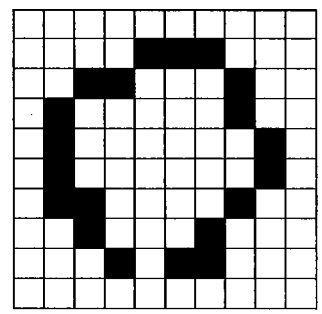
Figure 9A:
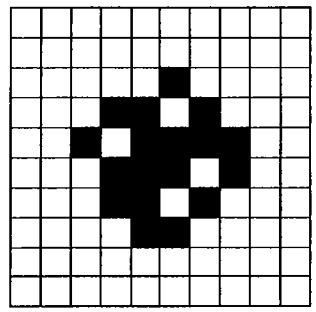
FIG. 9A, FIG. 9B, FIG. 9C, FIG. 9D, FIG. 9E, FIG. 9F and FIG. 9G are explanatory diagrams showing an AND operation with a mask 1 in the color dot application data generation operation of FIG. 1.
Figure 9B:
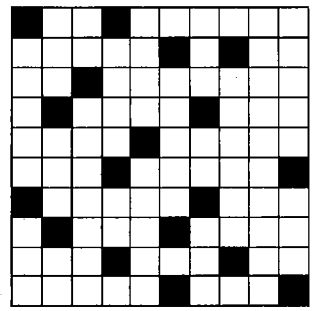
Figure 9E:
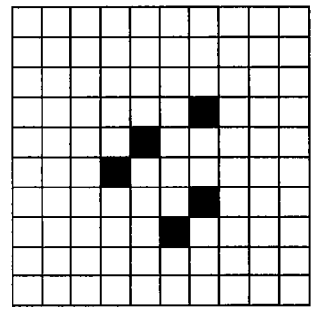
Figure 9C:
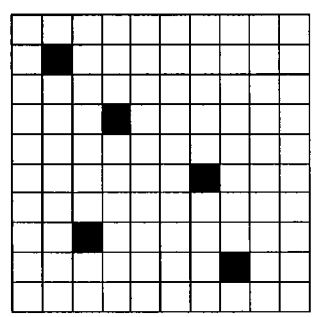
Figure 9F:
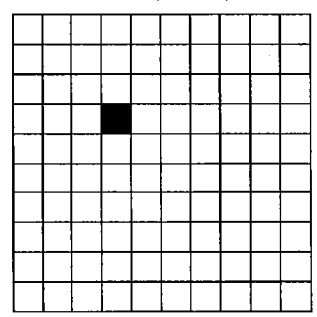
Figure 9D:
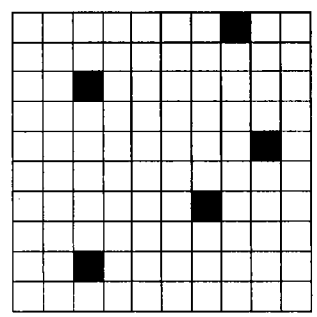
Figure 9G:
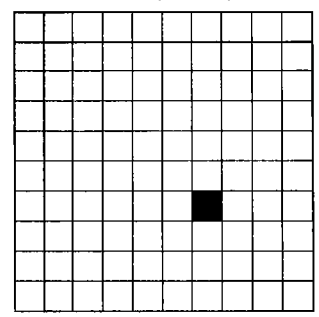
Figure 10A:
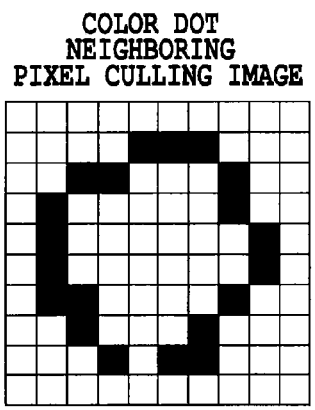
FIG. 10A, FIG. 10B, FIG. 10C, FIG. 10D, FIG. 10E, FIG. 10F and FIG. 10G are explanatory diagrams showing an AND operation with a mask 2 in the color dot application data generation operation of FIG. 1.
Figure 10B:
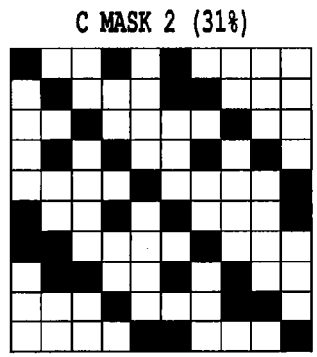
Figure 10E:
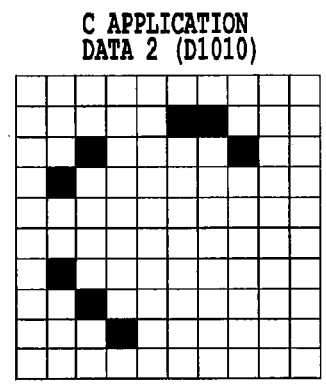
Figure 10C:
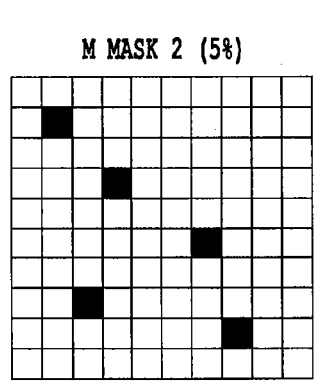
Figure 10F:
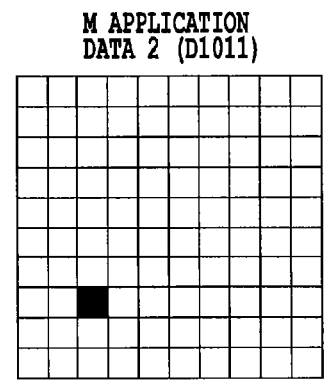
Figure 10D:
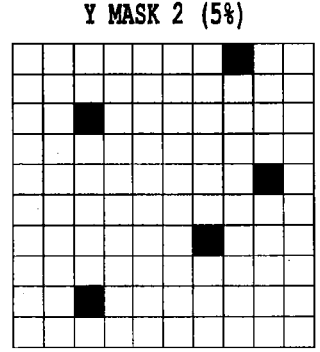
Figure 10G:
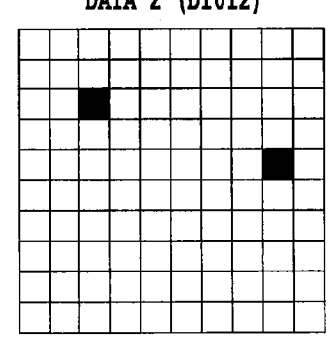

The color dot neighboring pixel culling data D2 of FIG. 8D is subjected to an AND operation E1005 with C mask 2, an AND operation E1006 with M mask 2, and an AND operation E1007 with Y mask 2 to generate color dot application data for bleeding prevention, i.e., C application data 2 D1010, M application data 2 D1011, and Y application data 2 D1012 More specifically, the AND operation E1005 takes a logical product or AND of the color dot neighboring pixel culling data D2 of FIG. 10A (same as FIG. 8D) and the C mask 2 data of FIG. 10B to generate the C application data 2 D1010 of FIG. 10E. Similarly, the AND operation E1006 takes a logical product or AND of the color dot neighboring pixel culling data D2 of FIG. 10A and the M mask 2 data of FIG. 10C to generate the M application data 2 D1011 of FIG. 10F. Similarly, the AND operation E1007 takes a logical product or AND of the color dot neighboring pixel culling data D2 of FIG. 10A and the Y mask 2 data of FIG. 10D to generate the Y application data 2 D1012 of FIG. 10G.

In this example, the amount of data that is not culled by the C mask 2 accounts for 31%; the amount of data that is not culled by the M mask 2 accounts for 5%; and the amount of data that is not culled by the Y mask 2 accounts for 5%. The reason that the ratio of data not culled by the C mask 2 is set relatively large is that an ink system is contemplated which causes only a cyan ink to react with a black ink for coagulation. The culling ratio and size of these masks 2 can be determined according to the characteristics of inks and the construction of the printing apparatus. Further, the arrangement or distribution of dots in masks 2 may have some regularity or randomness.

(PCBk Application Data Generation Operation E1009)

Figure 11A:
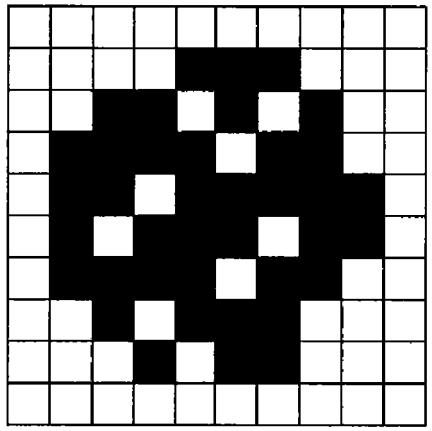
FIG. 11A, FIG. 11B, FIG. 11C and FIG. 11D are explanatory diagrams showing a PCBk application data generation operation of FIG. 1.
Figure 11B:
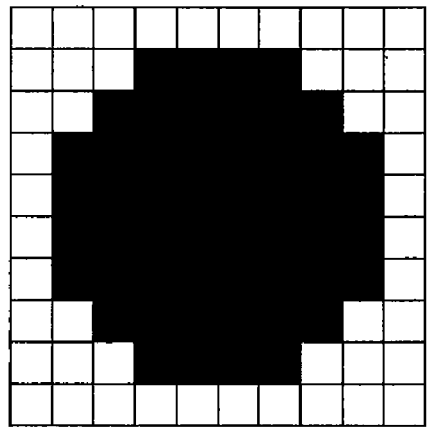
Figure 11C:
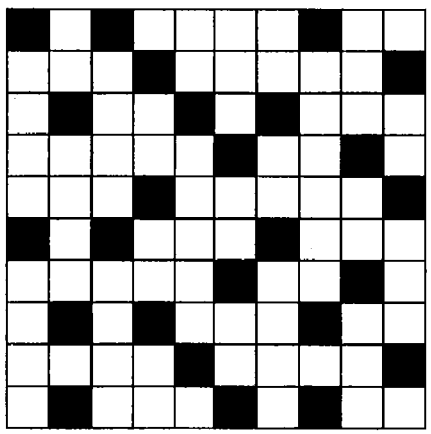
Figure 11D:
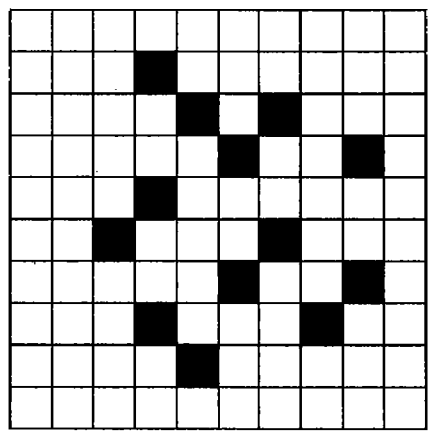

In this processing E1009, PCBk (process black) application data D1024 of FIG. 11D is generated. This data (PCBk application data) D1024 is the data that is culled from the original Bk image data D1000 of FIG. 11B to obtain print Bk image data D1016 of FIG. 11A. The PCBk application data 1024 can also be generated by taking a logical product or AND of the image data of FIG. 11A inverted and image data of FIG. 1B. The PCBk application data D1024 is data to make up for the pixel portions culled from the original Bk data D1000 with a process black (black formed by a combination of C, M and Y inks). In this processing E1009, the PCBk application data D1024 of FIG. 11D may also be generated by taking a logical product or AND of the inverted Bk culling mask of FIG. 11C, which is the Bk culling mask of FIG. 7B inverted, and the original Bk data D1000.

(Print CMY Data Generation Operation E2)

Figure 13A:
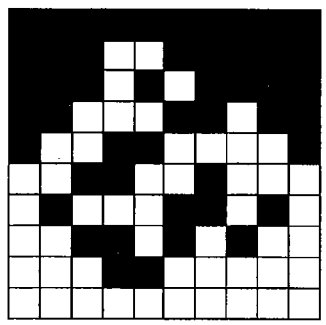
FIG. 13A, FIG. 13B and FIG. 13C are explanatory diagrams showing print color data generated by the print CMY data generation operation of FIG. 1.

In this generation operation E2, calculation units E14, E17, and E20 take logical add (logical OR) of the C application data 1 D1002, C application data 2 D1010, PCBk application data D1024, and the original C data D1005 to generate print C data D1013 shown in FIG. 13A. Similarly, calculation units E15, E18, and E21 take logical OR of the M application data 1 D1003, M application data 2 D1011, PCBk application data D1024, and original M data D1006 to generate print M data D1014 shown in FIG. 13B. Similarly, calculation units E16, E19, and E22 take logical OR of the Y application data 1 D1004, Y application data 2 D1012, PCBk application data D1024, and original Y data D1007 to generate print Y data D1015 shown in FIG. 13C.

Figure 12:
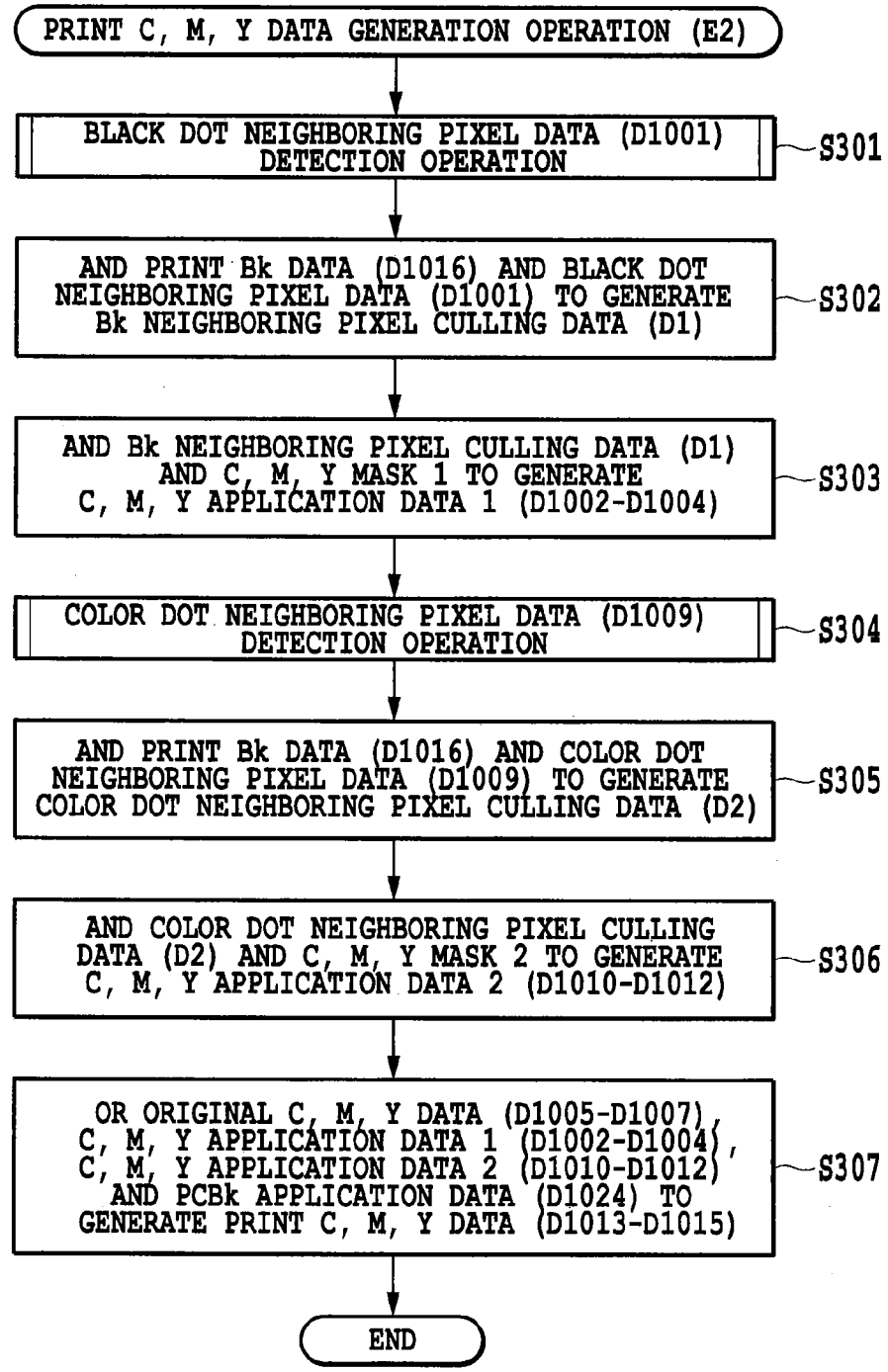
FIG. 12 is a flow chart showing a print CMY data generation operation of FIG. 1.

FIG. 12 is a flow chart showing a sequence of steps performed by the print CMY data generation operation E2 as well as the color dot application data generation operation E1 described earlier.

First, black dot neighboring pixel data D1001 is detected (step S301). The calculation unit E12 takes a logical AND of the data D1001 and the print Bk data D1016 to generate the Bk neighboring pixel culling data D1 (step S302). Then, AND operation units E1001, E1002, and E1003 take logical ANDs of the Bk neighboring pixel culling data D1 and C, M, Y masks 1 to generate C, M, Y application data 1 D1002, D1003, D1004 (step S303).

Next, the color dot neighboring pixel data D1009 is detected (step S304). The calculation unit E13 takes a logical AND of the color dot neighboring pixel data D1009 and the print Bk data D1016 to generate color dot neighboring pixel culling data D2 (step S305). Then, AND operation units E1005, E1006, and E1007 take logical ANDs of the color dot neighboring pixel culling data D2 and C, M, Y masks 2 to generate C, M, Y application data 2 D1010, D1011, D1012 (step S306).

Figure 13B:
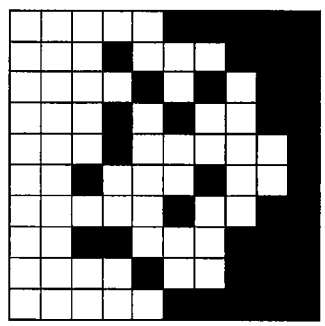
Figure 13C:
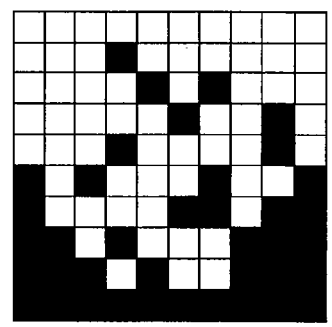
Figure 14:
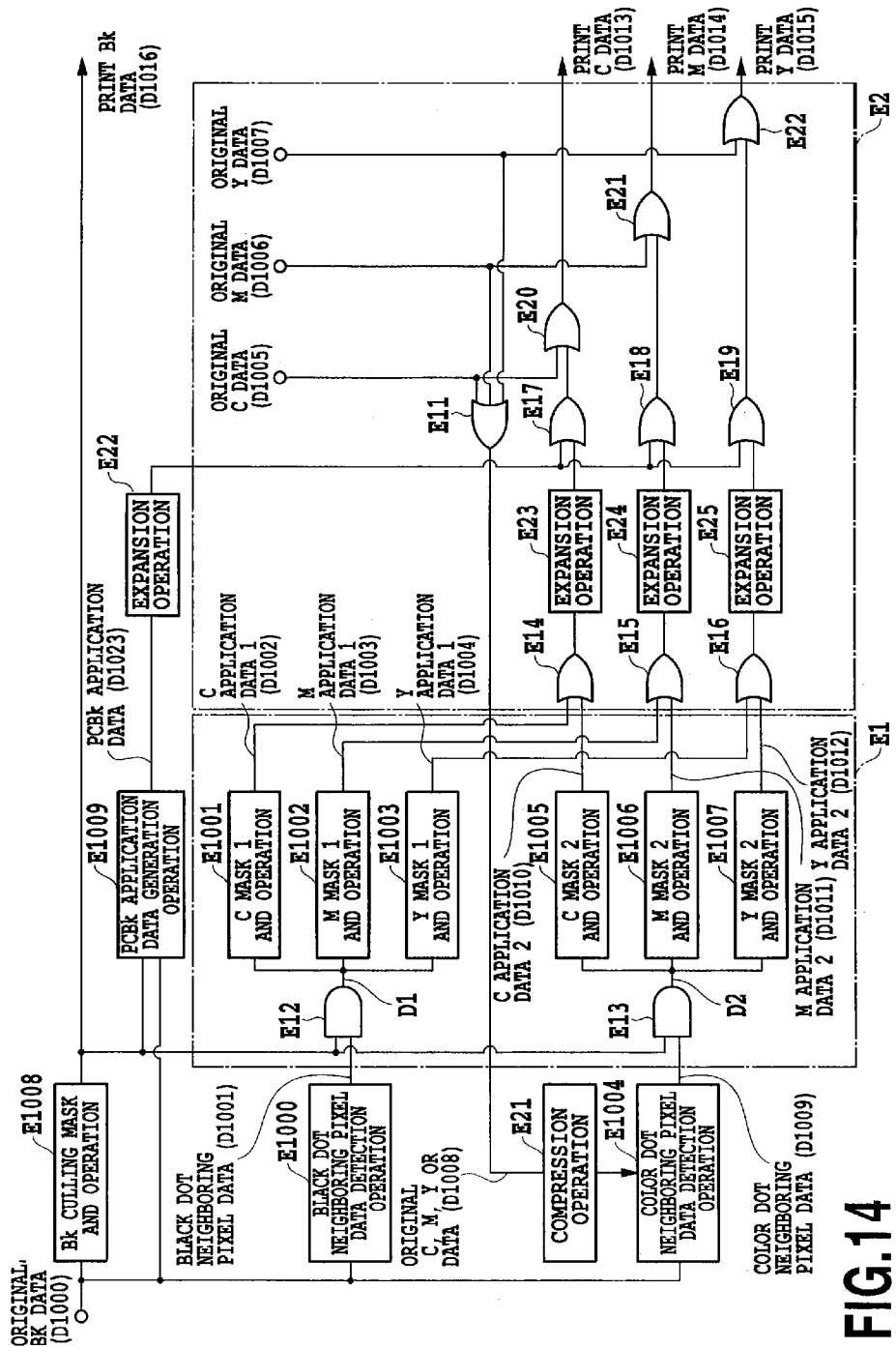
FIG. 14 is a block diagram showing an example configuration of a data processing system in a second embodiment of this invention.

After this, as described above, calculation units E14-E22 generate print C, M, Y data D1013, D1014, D1015 as shown in FIG. 13A, FIG. 13B and FIG. 13C (step S307).

As described above, this embodiment applies color inks to the black ink application areas with a relatively high print duty, excluding edge portions of characters, and at the same time applies the process black (black formed by a combination of C, M and Y inks) to areas where the original Bk data D1000 was culled. This minimizes a reduction in density in the black ink application areas and prevents smear in areas where black dots are formed at high duty, thereby printing high-quality black characters with sharp edges. In the boundary areas between the black ink application portions and the color ink application portions, smear prevention color dots are applied according to the C, M, Y application data 1 and at the same time boundary bleeding prevention color dots are applied according to C, M, Y application data 2.

Second Embodiment

FIG. 14 to FIG. 19C represent a second embodiment of this invention.

This embodiment is so constructed as to be able to deal with a situation where the original Bk data D1000 and the original color data (original C, M, Y data) D1005-D1007 have different resolutions, e.g., where the former has 600 dpi and the latter 1200 dpi. That is, as for the PCBk application data to apply a process black to where Bk data is culled, the density of the process black is adjusted by changing an expanded pattern of the PCBk application data. This method minimizes smear by applying color inks to the black ink application area and at the same time improves a quality of black images such as black characters. When color inks are applied to black ink application areas, the color inks may be applied first, followed by the black ink, or vice versa. The order of ink application can be set appropriately according to the characteristics of inks.

Example Configuration of Data Processing System

In this example, the original C, M, Y OR data D1008, produced by taking a logical OR of the original C data D1005, original M data D1006, and original Y data D1007, is compressed by a compression operation E21. The color dot neighboring pixel data detection operation E1004 processes the compressed OR data D1008 and the original Bk data D1000 to generate color dot neighboring pixel data D1009 for boundary bleeding prevention. The PCBk application data D1024 generated by the PCBk application data generation operation E1009 is expanded by an expansion operation E22 to become expanded PCBk application data D11. To generate print C, X, Y data D1013, D1014, D1015, expansion operations are performed by E23, E24, E25.

Other configurations are similar to those of the previous embodiment. In the following description, those constructions that are different from the previous embodiment will be detailed.

(Compression Operation E21)

Figure 15A:
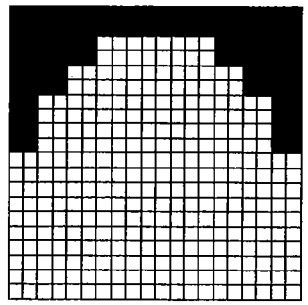
FIG. 15A, FIG. 15B, FIG. 15C, FIG. 15D, FIG. 15E, FIG. 15F and FIG. 15G are explanatory diagrams showing a compression operation of FIG. 14.
Figure 15B:
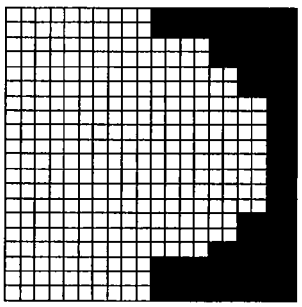
Figure 15C:
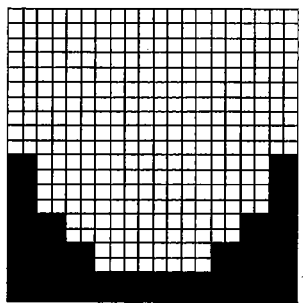
Figure 15D:
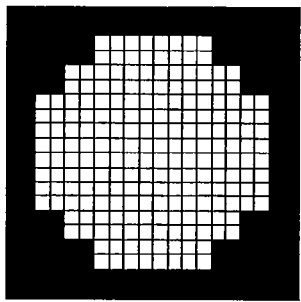
Figure 15E:
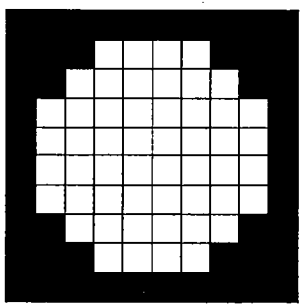

FIG. 15A represents original C data D1005 for an original C image; FIG. 15B represents original M data D1006 for an original M image; and FIG. 15C represents original Y data D1007 for an original Y image. In this example, these images have a resolution of 1200 dpi. FIG. 15E represents original Bk inverted image data similar to FIG. 2E and, in this example, its resolution is 600 dpi. Taking a logical OR of the C, M, Y original color data results in original C, M, Y OR image data D1008 of FIG. 15D. This OR data D1008 is compressed by E21. One lattice point of interest with a resolution of 600 dpi is made up of four lattice points of OR data D1008 with a resolution of 1200 dpi.

Figure 15F:
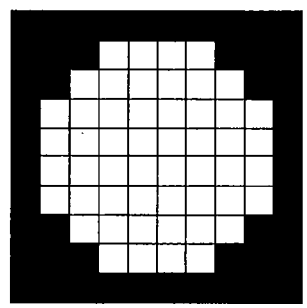
Figure 15G:
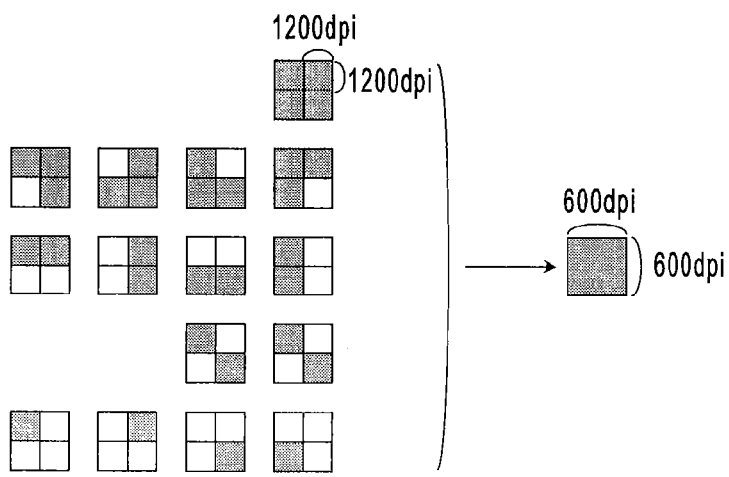

In the compression operation in this example, if color dot formation data exists in even one of the four 1200-dpi lattice points, as shown in FIG. 15G, a bit of the 600-dpi lattice point of interest is set. If there is no color dot formation data in any of the four 1200-dip lattice points, the bit for the 600-dpi lattice point of interest is not set. This compression operation E21 generates color dot area compressed image data shown in FIG. 15F. The number of color dots in the four 1200-dpi lattice points as a threshold for setting the bit for the 600-dpi lattice point of interest is not restricted to one alone, but may be determined appropriately according to the characteristics of inks and the construction of the printing apparatus.

The color dot neighboring pixel data detection operation E1004 takes a logical OR of the OR data D1008 compressed as described above and the original Bk inverted image of FIG. 2E to detect the color dot area compressed image of FIG. 15F. In this compression process, the threshold for setting a bit for the 600-dpi lattice point of interest, i.e., the number of 1200-dip dots making up the 600-dpi lattice point, can be set to a desired value according the characteristics of inks and the construction of the printing apparatus.

(Expanding Operation E22)

Figure 16E:
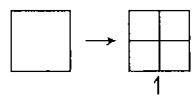

FIG. 16A represents print Bk image data (print Bk data) D1016, and FIG. 16B represents original Bk image data (original Bk data) D1000. The PCBk application data generation operation E1009, as in the previous embodiment, processes these image data to generate PCBk application image data (PCBk application data) D1024 shown in FIG. 16C. The expansion operation E22 in this embodiment uses an expansion pattern indicated by a solid line of FIG. 16E and expands the 600-dpi PCBk application data D1024 of FIG. 16C into the 1200-dip expanded PCBk image data (expanded PCBk application data) D11 shown in FIG. 16D. That is, when the bit for the 600-dpi lattice point of interest is set, the bits for the four 1200-dip lattice points making up the 600-dpi lattice point of interest are also set. The expansion pattern may be set arbitrarily according to the characteristics of inks and the construction of the printing apparatus. For example, the expansion pattern may be set as shown by the solid lines and two-dot chain lines in FIG. 16E.

(Expansion Operations E23, E24, and E25)

The C application data 1 D1002 and the C application data 2 D1010 are logically added (logically ORed) and expanded by E23 to produce expanded C application data D12. Then, the data D12, the original C data D1005, and the expanded PCBk application data D11 are logically ORed to generate print C data D1013. Similarly, the M application data 1 D1003 and the M application data 2 D1011 are logically ORed and expanded by E24 to generate expanded M application data D13. Then, the data D13, the original M data D1006, and the expanded PCBk application data D11 are logically ORed to generate print M data D1014. Also similarly, the Y application data 1 D1004 and the Y application data 2 D1012 are logically ORed and expanded by E25 to generate expanded Y application data D14. Then, the data D14, the original Y data D1007, and the expanded PCBk application data D11 are logically ORed to generate print Y data D1015.

Figure 17:
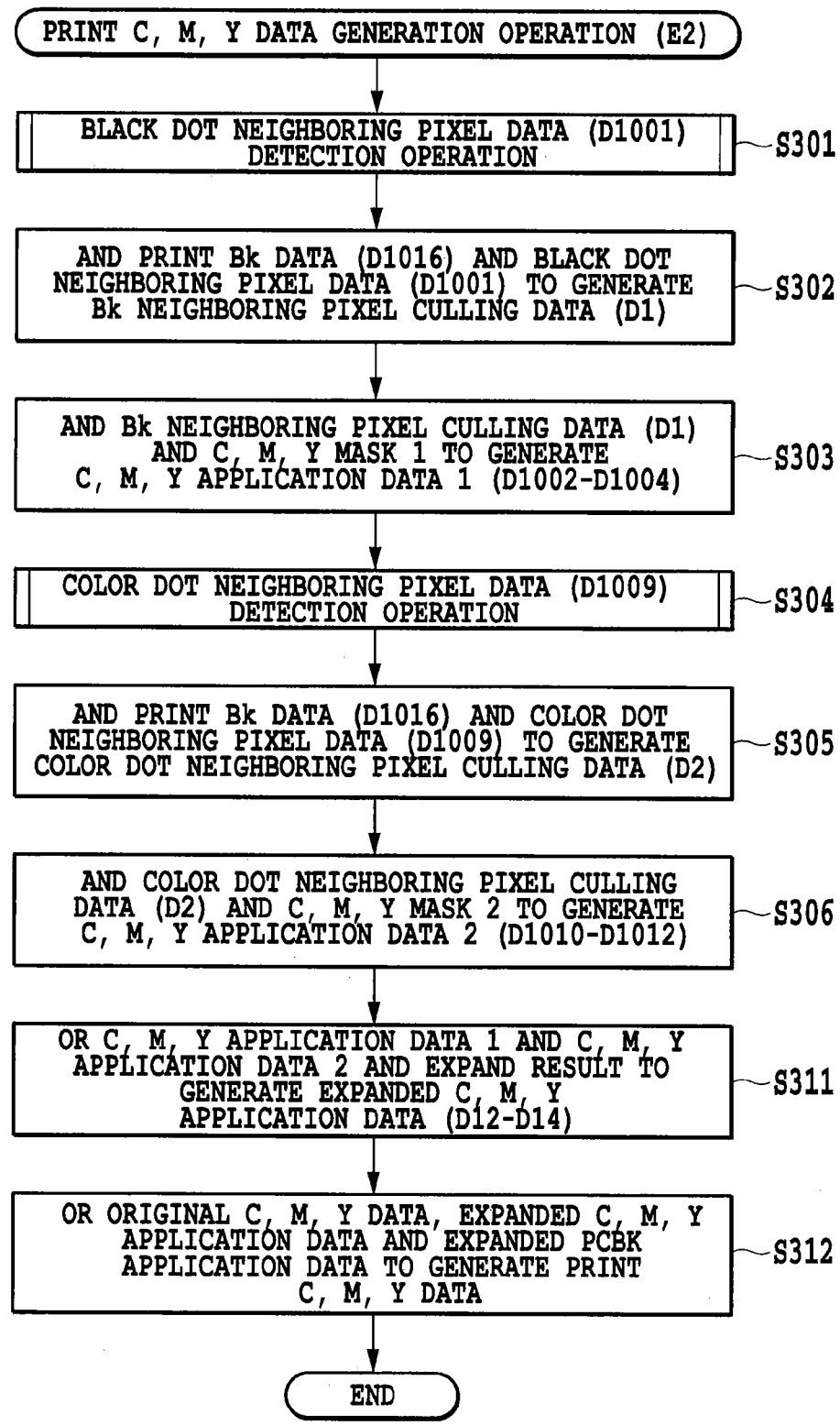
FIG. 17 is a flow chart showing a print CMY data generation operation of FIG. 14.

FIG. 17 is a flow chart showing a sequence of steps performed by the print CMY data generation operation E2 as well as the color dot application data generation operation E1 described earlier.

Figure 18G:
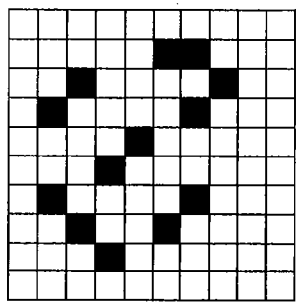
Figure 18G:
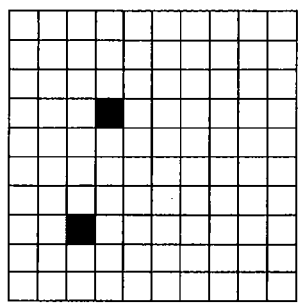
Figure 18G:
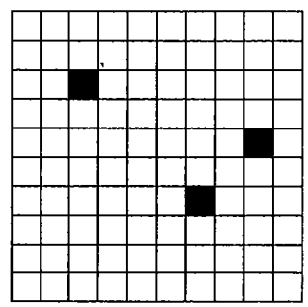
Figure 18G:
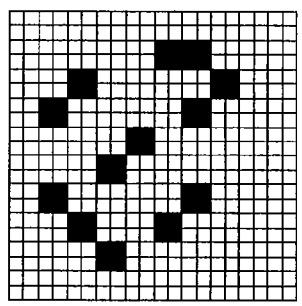
Figure 18G:
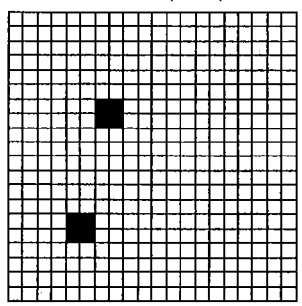
Figure 18G:
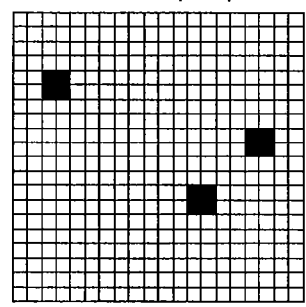
Figure 18G:
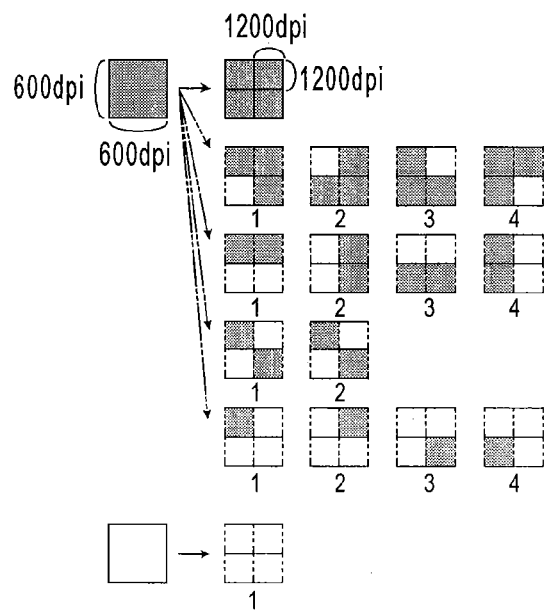
Figure 19A:
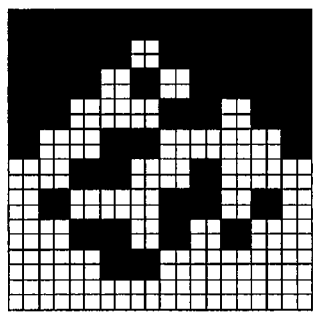
FIG. 19A, FIG. 19B and FIG. 19C are explanatory diagrams showing print color data generated by the print CMY data generation operation of FIG. 14.
Figure 19B:
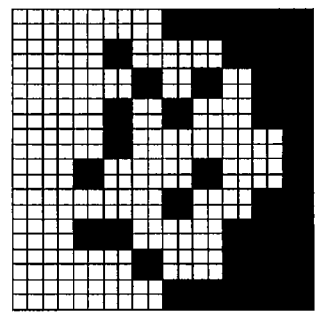
Figure 19C:
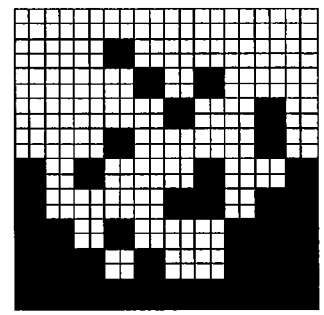

Steps S301-S306 are similar to the corresponding steps in FIG. 12. In this example, as described above, the compression operation E21 compresses the 1200-dip original CMY OR data D1008 into 600-dpi data, the 600 dpi being the same resolution as the print Bk data D1016. Therefore, the calculation unit E13 at step S305 can generate color dot neighboring pixel culling data D2 based on the data D1008, and D1016 of the same resolution, as in the previous embodiment In step S311, the calculation units E14, E15, and E16 take a logical OR of C, M, Y application data 1 and C, M, Y application data 2 with the same resolution of 600 dpi to generate 600-dpi image data as shown in FIG. 18A, FIG. 18B, and FIG. 18C. Further, these 600-dpi image data are expanded by E23, E24, and E25 to generate expanded C, M, Y application image data (expanded C, M, Y application data) D12, D13, and D14 with a resolution of 1200 dpi as shown in FIG. 18D, FIG. 18E, and FIG. 18F. In this example, an expansion pattern as indicated by solid lines in FIG. 18G is used for data expansion. That is, when a bit of a 600-dpi lattice point of interest is set, bits for four 1200-dip lattice points making up the 600-dpi lattice point are also set. The expansion pattern can be set arbitrarily according to the ink characteristics and the construction of the printing apparatus. For example, the expansion pattern may be set as shown by solid lines and two-dot chain lines in FIG. 18G.

After this, the calculation units E17-E22 take logical ORs of the 1200-dip original C, M, Y data D1005, D1006, D1007, the 1200-dip expanded C, M, Y application data D12, D13, D14 and the 1200-dip expanded PCBk application data D11 to generate print C, M, Y data D1013, D1014, D1015 (step S312).

In this example, the original Bk data D1000 is set at a resolution of 600 dpi and the original C, M, Y data D1005, D1006, D1007 are set at 1200 dpi. The levels of resolution of these two data and their relation are not limited to the above and may be set otherwise as long as the color dot application data generation operation E1 that relates the two data to each other can at least match them to the same resolution. In that case, one of the two data with different resolutions may be compressed or expanded. It is also noted that the print Bk data D1016 does not need to be set to 600 dpi, the same resolution as the original Bk data D1000, nor do the print C, M, Y data D1013, D1014, D1015 need to be set to 1200 dpi, the same resolution as the original C, M, Y data D1005, D1006, D1007.

As described above, in this embodiment, when the original Bk data and the original C, M, Y data differ in resolution, these data are either compressed or expanded for generating color dot application data. As a result, color inks are applied to areas where Bk ink is applied at relatively high duty, except for the edge portions of characters, and at the same time the process black (black formed by a combination of C, M and Y inks) Is applied to where the original Bk data D1000 is culled. This can minimize a density reduction in the black ink application areas, prevent smear in areas where black dots are formed at high duty, and print high quality black characters with sharp edges. Boundary areas between black ink and color ink application areas are applied with smear prevention color dots based on the C, M, Y application data 1 and also with boundary bleeding prevention color dots based on the C, M, Y application data 2. As a result, both smear and boundary bleeding can be prevented at the same time.

The present invention has been described in detail with respect to preferred embodiments, and it will now be apparent from the foregoing to those skilled in the art that changes and modifications may be made without departing from the invention in its broader aspects, and it is the intention, therefore, that the appended claims cover all such changes and modifications.

This application claims priority from Japanese Patent Application No.2004-177376 filed Jun. 15, 2004, which is hereby incorporated by reference herein.

What is claimed is:

1. An ink Jet printing apparatus to form an image on a print medium by using a print head, wherein the print head can eject at least a black ink and a plurality of color inks capable of forming a black by color mixing, the ink jet printing apparatus comprising:
   print black data generation means for generating print black data used to apply the black ink to a part of pixels in a black image area;
   first color application data generation means for generating first color application data used to apply the plurality of color inks to a pixel in the black image area to which the black ink is not applied;
   second color application data generation means for generating second color application data used to apply at least one of the plurality of color inks to at least a part of pixels in the black image area to which the black ink is applied; and
   control means for controlling application of the black ink and the plurality of color inks from the print head onto the black image area based on the print black data, the first color application data, and the second color application data.

2. An ink jet printing apparatus according to claim 1, wherein
   the print black data generation means generates the print black data by culling black data corresponding to the black image area, and
   the first color application data generation means generates the first color application data based on the black data removed from the print black data.

3. An ink Jet printing apparatus according to claim 2, wherein the print black data generation means culls the black data by taking a logical product of the black data and a black data culling mask.

4. An ink jet printing apparatus according to claim 1, further including:
   first detection means for detecting a first pixel in the black image area whose neighboring pixels applied with the black ink are equal to or greater in number than a predetermined value,
   wherein the second color application data generation means generates the second color application data used to apply at least one of the plurality of color inks to the first pixel.

5. An ink jet printing apparatus according to claim 4, wherein the first detection means specifies a pixel of interest from among pixels making up the black image area and detects the pixel of interest as the first pixel when the number of pixels applied with the black ink which exist in a unit area made up of L×M pixels (L and M are natural numbers equal to or greater than 1) including the pixel of interest is equal to or greater than the predetermined value.

6. An ink jet printing apparatus according to claim 4, wherein the second color application data generation means generates the second color application data by taking a logical product of black data corresponding to the first pixel and a first color culling mask.

7. An ink jet printing apparatus according to claim 6, wherein the first color culling mask is provided for each of the plurality of color inks.

8. An ink jet printing apparatus according to claim 1, further including:
   second detection means for detecting a second pixel in the black image area whose neighboring pixels applied with the color ink are equal to or greater in number than a predetermined value; and
   third color application data generation means for generating third color application data used to apply at least one of the plurality of color inks to the second pixel,
   wherein the control means controls application of the black ink and the plurality of color inks from the print head onto the black image area based on the print black data, the first color application data, the second color application data, and the third color application data.

9. An ink jet printing apparatus according to claim 8, wherein the second detection means specifies a pixel of interest from among pixels making up the black image area and detects the pixel of interest as the second pixel when the number of pixels applied with the color ink which exist in a unit area made up of L×M pixels (L and M are natural numbers equal to or greater than 1) including the pixel of interest is equal to or greater than the predetermined value.

10. An ink jet printing apparatus according to claim 8, wherein the third color application data generation means generates the third color application data by taking a logical product of black data corresponding to the second pixel and a second color culling mask.

11. An ink jet printing apparatus according to claim 10, wherein the second color culling mask is provided for each of the plurality of color inks.

12. An ink jet printing apparatus according to claim 8, wherein the second detection means detects the second pixel based on color data corresponding to a color image area different from the black image area and on black data corresponding to the black image area.

13. An ink jet printing apparatus according to claim 8, wherein the black data corresponding to the black image area and the color data have different resolutions, the ink jet printing apparatus further including:
   print color data generation means for generating print color data by taking a logical add of the first color application data, the second color application data, the third color application data, and color data corresponding to a color image area; and
   resolution changing means for matching the resolutions of the first, second, and third color application data to that of the color data when the print color data generation means generates the print color data based on the color data and the first, second and third color application data.

14. An ink jet printing apparatus according to claim 13, wherein the resolution changing means matches the resolution of the black data to that of the color data when the second detection means detects the second pixel based on the black data and the color data.

15. An ink jet printing apparatus according to claim 13, wherein the resolution changing means includes a compression unit for reducing the resolution of one of the black data and the color data or an expansion unit for increasing the resolution of the other.

16. An ink jet printing apparatus according to claim 1, wherein the color inks include yellow, magenta and cyan inks.

17. An ink jet printing apparatus according to claim 1, wherein the black ink exhibits a lower penetrability than the plurality of color inks.

18. An ink jet printing apparatus according to claim 1, wherein at least one of the plurality of color inks contains a component that coagulates a colorant of the black ink.

19. An ink jet printing method to form an image on a print medium by using a print head, wherein the print head can eject at least a black ink and a plurality of color inks capable of forming a black by color mixing, the ink jet printing method comprising the steps of:

generating print black data used to apply the black ink to a part of pixels in a black image area;

generating first color application data used to apply the plurality of color inks to a pixel in the black image area to which the black ink is not applied;

generating second color application data used to apply at least one of the plurality of color inks to at least a part of pixels in the black image area to which the black ink is applied; and applying the black ink and the plurality of color inks from the print head onto the black image area based on the print black data, the first color application data, and the second color application data.

* * * * *

UNITED STATES PATENT AND TRADEMARK OFFICE
CERTIFICATE OF CORRECTION

PATENT NO. : 7,287,823 B2
APPLICATION NO. : 11/150118
DATED : October 30, 2007
INVENTOR(S) : Shimakawa It is certified that error appears in the above-identified patent and that said Letters Patent is hereby corrected as shown below:

ON THE TITLE PAGE:
At Item (57), Abstract, line 11, "C, M, Y, data." should read --C, M, Y data,--.

IN THE DRAWINGS:
Sheet No. 3, Figure 3, "ALL PIXEL" should read --ALL PIXELS--.
Sheet No. 5, Figure 5, "ALL PIXEL" should read --ALL PIXELS--.

COLUMN 1:
Line 14, "ink Jet" should read --ink jet--.

COLUMN 2:
Line 14, "No. 7-47762)" should read --No. 7-47762).--.
Line 22, "No. 2-303842)" should read --No. 2-303842).--.
Line 31, "measure," should read --measures,--.
Line 46, "characters If" should read --characters. If--.
Line 60, "Ink Jet" should read --ink jet--.

COLUMN 3:
Line 29, "black Ink" should read --black ink--.
Line 46, "color Inks," should read --color inks,--.

COLUMN 5:
Line 21, "four Ink" should read --four ink--.
Line 22, "color Inks" should read --color inks--.
Line 24, "these Inks." should read --these inks.--.
Line 51, "feeding an" should read --feeding, an--.

COLUMN 6:
Line 37, "Input" should read --input--.
Line 39, "306 The" should read --306. The--.
Line 43, "stored The" should read --stored. The--.
Line 59, "Improves," should read --improves,--.

COLUMN 7:
Line 1, "instantly-and" should read --instantly and--.
Line 21, "Is suitably" should read --is suitably--.
Line 34, "print signal." should read --print signal,--.

COLUMN 8:
Line 58, "(step 5103)." should read --(step S103).--.
Line 60, "newly target" should read --new target--.

COLUMN 9:
Line 6, "color Ink" should read --color ink--.
Line 32, "check" should read --checks--.
Line 43, "newly target" should read --new target--.
Line 50, "apparatus" should read --apparatus.--.

COLUMN 10:
Line 3, "D1016 In" should read --D1016. In--.
Line 6, "accounts" should read --account--.
Line 7, "pixels accounts" should read --pixels--.
Line 8, "accounts" should read --account--.
Line 19, "a-logical" should read --a logical--.
Line 45, "FIG. 9F Similarly," should read --FIG. 9F. Similarly,--.
Line 52, "data-that Is" should read --data that is--.
Line 67, "D1012 More" should read --D1012. More--.

COLUMN 11:
Line 33, "FIG. 1B." should read --FIG. 11B.--.
Line 44, "D1010." should read --D1010,--.

COLUMN 13:
Line 18, "1200-dip" should read --1200-dpi--.
Line 33, "1200-dip" should read --1200-dpi--.
Line 34, "according" should read --according to--.
Line 46, "1200-dip" should read --1200-dpi--.
Line 49, "1200-dip" should read --1200-dpi--.

COLUMN 14:
Line 12, "1200-dip" should read --1200-dpi--.
Line 18, "embodiment" should read --embodiment.--.
Line 30, "1200-dip" should read --1200-dpi--.
Line 37, "1200-dip" should read --1200-dpi--.
Line 38, "1200-dip" should read --1200-dpi--.
Line 39, "1200-dip" should read --1200-dpi--.
Line 63, "inks) Is" should read --inks) is--.

CERTIFICATE OF CORRECTION (continued)
U.S. Pat. No. 7,287,823 B2

COLUMN 15:
Line 15, "No.2004-177376" should read --No. 2004-177376--.
Line 18, "ink Jet" should read --ink jet--.
Line 48, "ink Jet" should read --ink jet--.

Signed and Sealed this

Sixteenth Day of February, 2010

David J. Kappos
*Director of the United States Patent and Trademark Office*